US006772154B1

(12) United States Patent
Daynès et al.

(10) Patent No.: US 6,772,154 B1
(45) Date of Patent: Aug. 3, 2004

(54) IMPLEMENTATION OF NESTED DATABASES USING FLEXIBLE LOCKING MECHANISMS

(75) Inventors: Laurent Daynès, Sunnyvale, CA (US); Ole Jørgen Anfindsen, Enebakk (NO)

(73) Assignee: Sun Microsystems, Inc., Santa Clara, CA (US)

(*) Notice: Subject to any disclaimer, the term of this patent is extended or adjusted under 35 U.S.C. 154(b) by 356 days.

(21) Appl. No.: 09/714,336

(22) Filed: Nov. 16, 2000

(51) Int. Cl.[7] .............................................. G06F 17/30
(52) U.S. Cl. ........................... 707/8; 707/101; 710/200
(58) Field of Search ......................... 707/1, 8, 10, 100, 707/101, 103, 109, 103 R; 710/200, 220, 240, 243, 244

(56) References Cited

U.S. PATENT DOCUMENTS

| | | | | | |
|---|---|---|---|---|---|
| 5,212,788 | A | * | 5/1993 | Lomet et al. ............... | 707/201 |
| 5,280,612 | A | * | 1/1994 | Lorie et al. ..................... | 707/8 |
| 5,907,848 | A | * | 5/1999 | Zaiken et al. ............... | 707/202 |
| 5,983,225 | A | | 11/1999 | Anfindsen ..................... | 707/8 |
| 6,044,370 | A | | 3/2000 | Anfindsen ...................... | 707/4 |
| 6,058,416 | A | * | 5/2000 | Mukherjee et al. ......... | 709/203 |
| 6,182,186 | B1 | * | 1/2001 | Daynes ....................... | 710/200 |
| 6,298,478 | B1 | * | 10/2001 | Nally et al. .................. | 717/170 |
| 6,343,339 | B1 | * | 1/2002 | Daynes ....................... | 710/200 |
| 6,457,065 | B1 | * | 9/2002 | Rich et al. .................. | 709/328 |

FOREIGN PATENT DOCUMENTS

WO          99/38095           7/1999

OTHER PUBLICATIONS

Daynes et al. "Customizing Concurrency Controls using Graph of Locking Capabilities" in Persistent Object Systems (Proc. of the Sixth Int. Workshop on Persisten Object Systems), Workshops on Computing, Tarascon Provence, France, Sep. 1994, 14 pages..*
Anfindsen. "Apotram—an Application–Oriented Transaction Model". Doctor Scient Thesis, UNIK Center for Technology at Kjeller, Department of Informatics, University of Oslo, Norway, Research Report 215, 1997, 124 pages.*
Daynes et al. "Lock Inheritance in Nested Transactions". 1994.*
Daynes. "Extensible Transaction Management in PJava".In the Pre–Proceedings of the 1st International Workshop on Persistence and Java, Sep. 1996.*
Ole Jorgen Anfindsen, "Apotram–An Application–Oriented Transaction Model," *Doctor Scient Thesis*, UNIK Center for Technology at Kjeller, Department of Informatics, University of Oslo, Norway, Research Report 215, 1997, 124 pages.

(List continued on next page.)

*Primary Examiner*—John Breene
*Assistant Examiner*—Khanh Pham
(74) *Attorney, Agent, or Firm*—Zagorin, O'Brien & Graham LLP

(57) ABSTRACT

Techniques have been developed whereby concurrency control mechanisms such as nested databases can be expressed in terms of operations implemented by various flexible transaction processing systems. For example, one such implementation of nested databases is particularly suitable for transaction processing systems that provides a lock delegation facility and which allow specification of ignore-conflict relationships between locking capabilities. By providing techniques that support movement of objects from a database to a subdatabase thereof, as well as termination (e.g., commit or abort) of transactions and databases (including subdatabases), transaction processing systems can provide advanced transaction models with unconventional concurrency control mechanisms. Some realizations allow specification of uses of parameters with lock modes and facilitate transformation of such uses into a form suitable for utilization in execution environments that support ignore-conflict relationships.

42 Claims, 8 Drawing Sheets

OTHER PUBLICATIONS

P. K. Chrysanthis and K. Ramamritham, "Synthesis of Extended Transaction Models Using ACTA," *ACM Transactions on Database Systems*, vol. 19, No. 3, Sep. 1994, pp. 450–491.

A. Biliris et al., "ASSET: A System Supporting Extended Transactions," in *Proc. Of the ACM SIGMOD Int. Conf. on Management of Data*, Minneapolis, MN, May 1994, pp. 44–54.

Laurent Daynes and Olivier Gruber, "Customizing Concurrency Controls Using Graph of Locking Capabilities," in *Persistent Object Systems* (Proc. Of the Sixth Int. Workshop on Persistent Object Systems), Workshops on Computing, Tarascon, Provence, France, Sep. 1994, 14 pages.

Roger Barga and Carlton Pu, "A Practical and Modular to Implement Extended Transaction Models," *Proc. Of the 21st Int. Conf. on Very Large Databases*, Zurich Switzerland, Sep. 1995, pp. 206–217.

George Heineman and Gail Kaiser, "The CORD Approach to Extensible Concurrency Control," *Advanced Research Project Agency*, Rome Lab F30602–64–C–0197, WPI–C–S–TR–96–1, 1996, pp. 1–22.

"Apotram AS—the Application–Oriented Transaction Management Company," Telenor [printed on Apr. 24, 2000] Retrieved from the Internet <URL: http://www.apotram.com>, 3 pages.

"Technical Summary of Apotram," Telenor [printed on Apr. 24, 2000] Retrieved from the Internet <URL: http://www.apotram.com/techsummary.html>, 3 pages.

Laurant Daynes and Ole Anfindsen, U.S. App. No. 09/663208, filed Sep. 15, 2000, "Implementation of Parameterized Locking Modes Using Ignore–Conflict Relationships," 47 pp.

* cited by examiner

|   | R | W |
|---|---|---|
| R | * |   |
| W |   |   |

\* = COMPATIBILITY

FIG. 1A

|      | R(a) | W(b) |
|------|------|------|
| R(a) | *    | ?    |
| W(b) | ?    |      |

\* = COMPATIBILITY
? = CONDITIONAL COMPATIBILITY

FIG. 1B $\forall T, \forall D, D = visited(T),$ $\forall T, \forall D, visited(T) \in Inferior(D),$ $\forall T, \forall D, \forall X, T \text{ uses } R(S)W(X) \wedge D \text{ uses } S_w \wedge S_w \subseteq S \wedge D \in Inferior(visited(T)),$ $\forall T, \forall T_w, \forall X, \forall Y, T \text{ uses } R(S)W(X) \wedge T_w \text{ uses } R(Y)W(S_w) \wedge S_w \subseteq S \wedge visited(T_w) \in Descendant(visited(T)),$ $\forall T, \forall T_r, \forall X, \forall Y, T \text{ uses } R(X)W(S) \wedge T_r \text{ uses } R(S_r)W(Y) \wedge S_r \supseteq S \wedge visited(T_r) \in Ancestor(visited(T)),$ $C_T \xrightarrow{all} \{C_D, C_D^{po}, C_D^{poc}\}$ $C_T \xrightarrow{all} \{C_D^{po}, C_D^{poc}\}$ $C_T \xrightarrow{r/w} \{C_D, C_D^{po}, C_D^{poc}\}$ $C_T \xleftrightarrow{r/w} C_{T_x}$ $C_T \xleftrightarrow{w/r} C_{T_r}$

FIG. 5

// moving of object O by transaction T to T's sub – database D
move($T$ : Transaction, $D$ : Database, $O$ : Object)
   if ( $C_{visited(T)} \in$ Owners (lock($O$), Write))
      delegate($\{C_T, C_{visited(T)}\}$, lock($O$), $\{C_D, C_D^{po}\}$)
   else
      delegate($\{C_T\}$, lock($O$), $\{C_D, C_D^{poc}\}$)
   endif

FIG. 6A commit($D$)
   delegate($C_D, C_{Creator(D)}$)
   delegate($C_D^{po}, C_{visited(Creator(D))}$)
   release($C_D^{poc}$)

FIG. 6B abort($D$)
   delegate($C_D^{po}, \{C_{Creator(D)}, C_{visited(Creator(D))}\}$)
   delegate($C_D^{poc}, C_{Creator(D)}$)
   release($C_D$)

FIG. 6C

FIG. 8A $\forall T, \forall D, D = visited(T),$ $\forall T, \forall D, visited(T) \in Inferior(D),$ $\forall T, \forall D, \forall X, T \text{ uses } R(S)W(X) \wedge D \text{ uses } S_w \wedge \Phi(S, S_w) \wedge D \in Inferior(visited(T)),$ $\forall T, \forall T_w, \forall X, \forall Y, T \text{ uses } R(S)W(X) \wedge T_w \text{ uses } R(Y)W(S_w) \wedge \Phi(S, S_w) \wedge visited(T_w) \in Descendant(visited(T)),$ $\forall T, \forall T_r, \forall X, \forall Y, T \text{ uses } R(X)W(S) \wedge T_r \text{ uses } R(S_r)W(Y) \wedge \Phi(S_r, S) \wedge visited(T_r) \in Ancestor(visited(T)),$ $C_T \xrightarrow{all} \{C_D, C_D^{po}, C_D^{poc}\}$ $C_T \xrightarrow{all} \{C_D^{po}, C_D^{poc}\}$ $C_T \xrightarrow{r/w} \{C_D, C_D^{po}, C_D^{poc}\}$ $C_T \xleftrightarrow{r/w} C_{T_w}$ $C_T \xleftrightarrow{w/r} C_{T_r}$

FIG. 8B $\forall T, \forall D, D = visited(T),$ $\forall T, \forall D, visited(T) \in Inferior(D),$ $\forall T, \forall D, \forall X, T \text{ uses } R(S)W(X) \wedge D \text{ uses } S_w \wedge \Phi(S, S_w) \wedge D \in Inferior(visited(T)),$ $\forall T, \forall T_w, \forall X, \forall Y, T \text{ uses } R(S)W(X) \wedge T_w \text{ uses } R(Y)W(S_w) \wedge \Phi(S, S_w) \wedge visited(T_w) \in Descendant(visited(T)),$ $\forall T, \forall T_r, \forall X, \forall Y, T \text{ uses } R(X)W(S) \wedge T_r \text{ uses } R(S_r)W(Y) \wedge \Phi(S_r, S) \wedge visited(T_r) \in Ancestor(visited(T)),$ $C_T \xrightarrow{all} \{C_D, C_D^{po}, C_D^{poc}\}$ $C_T \xrightarrow{all} \{C_D^{po}, C_D^{poc}\}$ $C_T \xrightarrow{M_t/M_w} \{C_D, C_D^{po}, C_D^{poc}\}$ $C_T \xleftrightarrow{M_t/M_w} C_{T_w}$ $C_T \xleftrightarrow{M_w/M_t} C_{T_r}$

IMPLEMENTATION OF NESTED DATABASES USING FLEXIBLE LOCKING MECHANISMS

BACKGROUND OF THE INVENTION

1. Field of the Invention

The present invention relates to transaction models for data systems and, more particularly, to techniques for implementing nested databases using ignore conflicts relationships and lock delegation.

2. Description of the Related Art

A concurrency control approach based on nested databases was defined by Anfindsen (see generally, Ole Jorgen Anfindsen, *Apotram-An Application-Oriented Transaction Model,* Doctor Scient Thesis, UNIK Center for Technology at Kjeller, Department of Informatics, University of Oslo, Norway, Research Report 215, pp. 45–52, 1997) and has since been developed as the APOTRAM™ implementation of a transaction model. APOTRAM™ is a trademark of Telenor AS, Oslo, Norway.

In summary, the nested database techniques described by Anfindsen provided concurrency controls that facilitate update (generally, write access) to a given data item in a controlled manner. Execution of a nested transaction was viewed as a dynamically developing hierarchy of spheres of control (SOCs). Write spheres of control (WSOCs) were viewed as a special case of a database and, in particular, Anfindsen proposed allowing a write sphere of control (WSOC) to be dynamically converted to a database SOC at the will of the owning transaction. In doing so, the transaction in question created a subdatabase and could decide exactly which transactions should be allowed to access the subdatabase, and in which access modes. The subdatabase was converted back to a WSOC when no transactions were active inside it, and the owning transaction had control over the enclosed data item is if and when the contents of the subdatabase were committed to the enclosing database.

Anfindsen combined and integrated the notion of nested conflict serializability (NCSR) with conditional conflict serializability (CCSR) to provide a framework that dealt in a systematic way with read-write, write-read and write-write conflicts. In general, CCSR is a superset of the conflict serializability (CSR) correctness criterion that is enforced by the Atomicity, Consistency, Isolation and Durability (ACID) transaction model, the transaction model universally supported by OLTP and database systems. In transaction processing systems (TPSs) conforming to the CSR correctness criterion, conflicts between transactions are based on the commutativity of operations. In general, a conflict resulting from a request for a lock in mode $M_1$ against a lock held in mode $M_2$ can be described as an $M_1$–$M_2$ conflict. For the typical case of operations categorized as reads or writes, the CSR correctness criterion prevents any read-write, write-read, and write-write conflict. The CCSR correctness criterion weakens constraints in an application-defined way by allowing read-write and write-read pairs of operations to conflict conditionally (i.e., according to some application-defined condition).

If subdatabases can be nested to arbitrary depths, transaction histories in subdatabases are CSR, and transactions in subdatabase histories commit to the subdatabase owner, then the resulting transaction history will be nested conflict serializable (NCSR). Nested databases and transaction histories that conform to the NCSR correctness criterion can provide a mechanism for handling write-write conflicts. An implementation in which nested databases individually conform to the CCSR correctness criterion is said to be nested conditional conflict serializable (NCCSR).

A transaction processing system that supports NCCSR or NCSR would be desirable for many applications in domains like collaborative authoring/editing, CASE, CAD, or other systems in which two or more users may perform collaborative work on a set of resources (e.g., database objects, records or data). Unfortunately, commercially available transaction processing systems do not typically provide native support for nested databases. Accordingly, techniques are desired whereby nested databases may be supported in the context of transaction processing system primitives and/or constructs that are, or are likely to become, commercially available.

SUMMARY OF THE INVENTION

Techniques have been developed whereby concurrency control mechanisms such as nested databases (e.g., as defined by Anfindsen or otherwise) can be expressed in terms of operations implemented by various flexible transaction processing systems. In particular, some realizations in accordance with the present invention implement nested databases in a framework that allows specification of ignore-conflict relationships between locking capabilities and which provides a lock delegation facility.

By providing techniques that support movement of objects from a database to a subdatabase thereof, as well as termination (e.g., commit or abort) of transactions and databases (including subdatabases), realizations in accordance with the present invention can facilitate adoption and use of advanced transaction models with unconventional concurrency control mechanisms. Some realizations in accordance with the present invention allow specification of uses of parameters with lock modes and facilitate transformation of such uses into a form suitable for utilization in execution environments that support ignore-conflict relationships.

BRIEF DESCRIPTION OF THE DRAWINGS

The present invention may be better understood, and its numerous objects, features, and advantages made apparent to those skilled in the art by referencing the accompanying drawings.

FIG. 1A depicts a compatibility matrix for classical concurrency controls that enforce the conflict serializability correctness criterion for read and write lock modes. In contrast, FIG. 1B depicts a compatibility matrix for concurrency control implementation in which conflicts are conditionally determined based on relations between sets of parameters used with read and write lock modes.

FIG. 5 illustrates an exemplary set of ignore conflicts relationships suitable for some embodiments of the present invention, which provide nested database facilities and allow parameterization of lock modes.

FIGS. 6A, 6B and 6C illustrate functional sequences suitable for implementation of move, commit and abort operations in accordance with some embodiments of the present invention.

FIGS. 8A and 8B illustrate variations on the exemplary set of ignore conflicts relationships. In particular, FIG. 8A illustrates modifications consistent with a generalization of relations between parameter sets. FIG. 8B illustrates modifications consistent with alternative sets of access modes.

The use of the same reference symbols in different drawings indicates similar or identical items.

DESCRIPTION OF THE PREFERRED EMBODIMENT(S)

Figure 2:
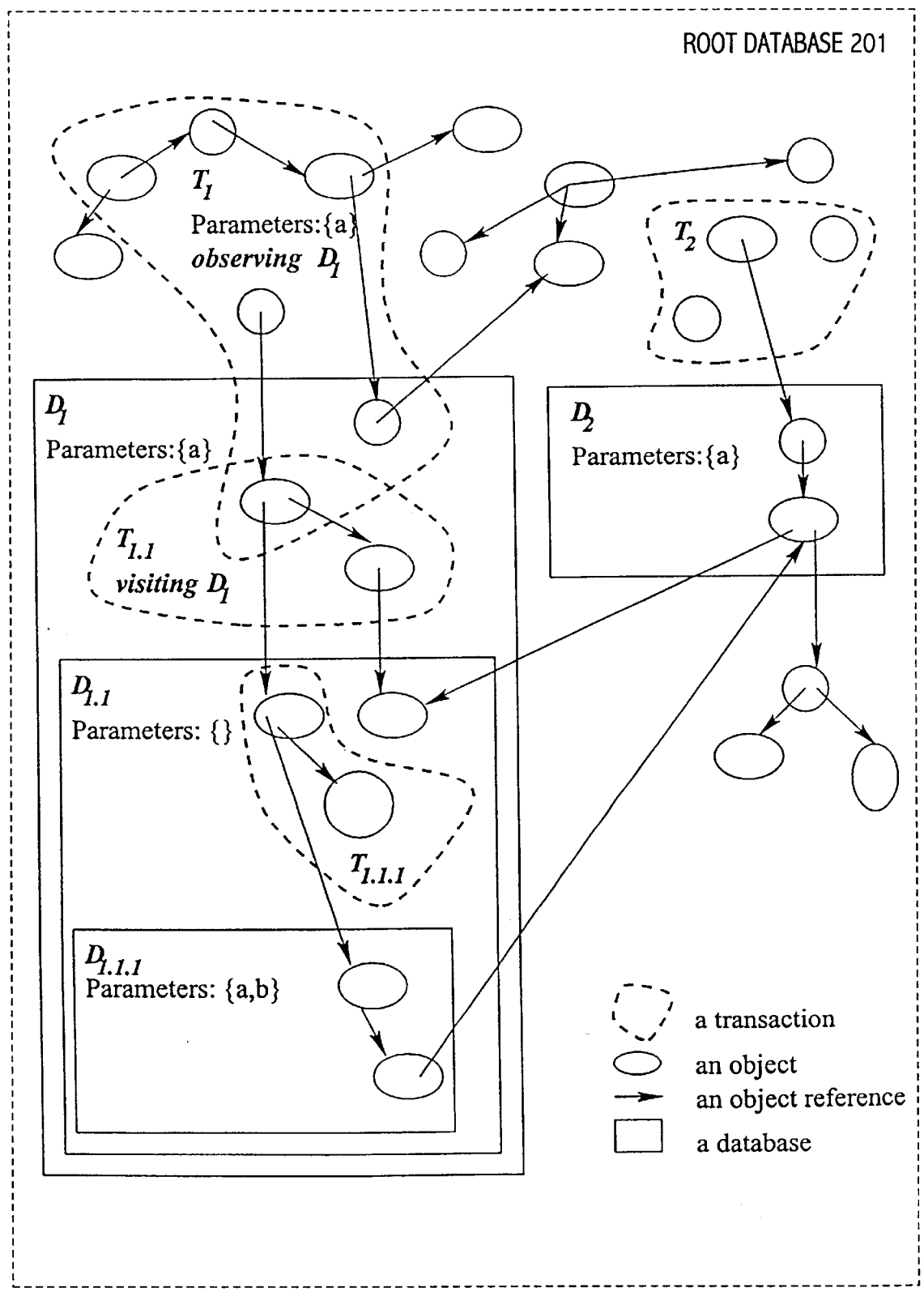
FIG. 2 illustrates a typical use of nested databases.

The description that follows presents a set of techniques, systems, objects, functional sequences and data structures associated with concurrency controls for cooperative operations on resources. An exemplary implementation focuses on an environment in which the semantics of nested databases are provided using a lock delegation mechanism and ignore conflict relationships between transactions. In some realizations, uses of lock mode parameters by transactions are transformed into a form suitable for coordination of transactions using locks in a transaction processing system (TPS) that allows one transaction to ignore conflicts with a set of other transactions.

Some realizations in accordance with the present invention are particularly adapted to providing transaction generating applications with a nested database abstraction in transaction processing systems that provide primitives that allow specification of ignore conflicts relationships between transactions. Accordingly, some implementations take the form of an interface between resource consumers, e.g., applications, transactions and/or databases, and a separate resource locking facility, e.g., of a database or transaction processing system.

However, more generally, the techniques, systems, objects, functional sequences and data structures may be used in combination and/or integrated with applications, locking facilities and/or transaction processing systems. For example, without limitation, realizations in accordance with the present invention may be embodied as (1) functionality integrated or supplied with transaction generating applications (e.g., as functions, libraries or services thereof), as (2) functionality (e.g., as processes, services, etc.) interposed or suitable as an intermediary between transaction generating applications and a locking facility of a transaction processing system, or as (3) functionality supporting a parameterized lock mode interface in a database or transaction processing system that employs ignore conflicts primitives as part of its underlying lock management facility. In some implementations, the ability to specify ignore conflicts relations may not be externally visible. Furthermore, while much of the description that follows focuses on transactions, persons of ordinary skill in the art will appreciate based on the description herein, systems are envisioned in which locking capabilities are associated with a variety of entities (e.g., transactions, cooperating groups, logical databases, etc.) that control visibility of shared data or resources.

In view of the above, and without limitation, the description that follows focuses on an exemplary environment in which nested databases are provided using locking capabilities and a lock delegation mechanism. However, this and other embodiments will be appreciated by persons of ordinary skill in the art based on this description and may fall within the scope of the claims that follow.

Concurrency Controls and Terminology

An exemplary set of concurrency control mechanisms is now described. Because, some particularly advantageous realizations provide both parameterized lock modes and nested databases, some aspects of the description that follows presume both facilities. For example, in some realizations, a facility is provided by which application specified uses of lock mode parameters are transformed, at run-time, into a form suitable for coordination amongst transactions using locks in a transaction processing system (TPS) that allows one transaction to ignore conflicts with a set of other transactions defined by ignore conflicts relationships. U.S. patent application Ser. No. 09/663,208, entitled "Implementation of Parameterized Locking Modes Using Ignore-Conflict Relationships," naming Laurent Daynes and Ole Jørgen Anfindsen as inventors, filed 15 Sep. 2000, and which is incorporated herein by reference herein, describes some implementations of such a facility.

Nonetheless, other realizations need not include such a facility. For example, in some realizations, ignore-conflicts relationships may be expressed or defined directly, or may be derived or transformed from other expressions of conditional conflicts. Accordingly, based on the description herein, persons of ordinary skill in the art will appreciate other realizations that may not include parameterized lock modes. In view of the foregoing, and without limitation, some aspects of one realization of parameterized lock modes are now described.

Parameterized Lock Modes

Locking can be implemented by associating each unit of concurrency control with a lock. Shared resources are grouped into such units of concurrency control. The size of a unit, in terms of the number of shared resources, defines the granularity of locks which determines the maximum degree of concurrency: the smaller the unit, the higher the concurrency. In an object-based system, the term "object locking" is used to mean that each object is the unit of concurrency control, or, in other words, that each object is associated with a distinct lock. Examples that follow assume object locking, although suitable granularity is, in general, application dependent.

A lock is a mechanism, which is typically provided in computational systems, for mediating access to shared resources. Often, a lock can be represented as a data structure that records the identity of the transactions or other entities that are given the right to perform operations on the resource(s) the lock protects. The transactions identified by a lock are typically called the owners of that lock. In general, a transaction may be granted ownership of a lock for particular access or locking modes. Typically, there is one locking mode defined per kind of operation. As a result, a lock implementation may encode an owner set for each locking mode to keep track of those transactions, if any, that were granted the lock in that mode.

In general, a variety of locking modes may be defined. However, in practice, operations may often be categorized into read and write operations. In such situations, two lock modes are typically used: read and write. Therefore, without loss of generality, the description that follows introduces parameterized lock modes in the context of read and write lock modes.

A compatibility matrix such as illustrated in FIG. 1A defines the compatibility between locking modes. A lock manager operates in accordance with such a compatibility matrix to detect conflicts between a lock request and the current state of the requested lock. As illustrated in FIG. 1A, a request (by one transaction) for a lock in a read mode is compatible with ownership (by another transaction) of the lock in read mode. Conflicts are determined unconditionally and all other permutations conflict. Persons of ordinary skill in the art will recognize the compatibility matrix of FIG. 1A as that of classical implementations that enforce the CSR correctness criterion.

In contrast, parameterized lock modes modify the classical compatibility matrix by expressing conflicts conditionally, where the operative conditions are specified as a function of relations between sets of parameters associated with a lock request and sets of parameters associated with the current state. For example, let R(a) and W(b) denote a parameterized read and write mode respectively, where a and b denote subsets of some parameter domain D. As before, a request (by one transaction) for a lock in a read mode is compatible with ownership (by another transaction) of the lock in read mode. However, as illustrated in FIG. 1B, a request (parameterized in terms of a) for a lock in a read mode is conditionally compatible with ownership (parameterized in terms of b) of the lock in a write mode.

As is described in greater detail below with reference to relations employed in transforming from parameterized lock modes to ignore-conflicts relations, the selection of a particular relation between parameters for altering the compatibility of lock modes is somewhat arbitrary. However, one particularly intuitive conditional compatibility relation is a set relation whereby parameterized lock modes conflict unless $b \subseteq a$. Accordingly, much of the parameterized lock modes description that follows (as well as much of the description of relations employed in transforming from parameterized lock modes to ignore-conflicts relations) is in terms of the subset relation between parameter sets (and its counterpart relations for transformations). Nonetheless, based on the description herein persons of ordinary skill in the art will appreciate that other relations may be employed.

In view of the above and without limitation, FIG. 1B, when considered in the context of the illustrated subset relation will be understood as follows. A request (parameterized in terms of a) for a lock in a read mode is compatible with ownership (parameterized in terms of b) of the lock in a write mode if and only if b is a subset of a. Similarly, a request (parameterized in terms of b) for a lock in a write mode is compatible with ownership (parameterized in terms of a) of the lock in a write mode if and only if b is a subset of a. Assuming the illustrated set relation, non-parameterized read and write modes, previously denoted R and W, can be represented as the parameterized modes $R(\emptyset)$ and $W(*)$, where $\emptyset$ denotes the empty set and * denotes an arbitrary superset of the domain of parameter values used. In the general case of multiple domains used in a given system, * would denote an arbitrary superset of the union of all such domains. Thus, according to the definition of parameterized lock mode compatibility, $R(\emptyset)$ is incompatible with all write modes and $W(*)$ is incompatible with all read modes.

Nested Databases

To facilitate an understanding of one particular realization in accordance with the present invention, more detailed description of a computational model follows. In addition, based on the computational model, several advantages and properties of the particular realization are demonstrated. In some cases, these advantages and properties are illustrated or proved. As with most proofs, particular behaviors and properties are demonstrated based on invariants, i.e., attributes that are always or never true. Accordingly, the demonstration of advantages and properties of a particular implementation necessarily includes assertions of invariants, i.e., statement that for one very specific realization, certain things are always or never true or must be or behave in a certain way. Persons of ordinary skill in the art will appreciate that such assertions are particular to a specific realization. Other realizations in accordance with the present invention, including other realizations that exhibit the same or similar advantages and properties may violate some or all of the realization-specific invariants. Typically, other sets of invariants will be appropriate for a proof that these other realizations exhibit such advantages and/or properties.

In this regard, the claims that follow define the scope of the invention, not any realization-specific proof or invariants. Accordingly, a particular computational model and proof of certain properties is now provided without limitation on the variety of embodiments in accordance with the present invention. The particulars of an exemplary implementation should not be taken as limitations on the nested database technology described and claimed elsewhere herein. Many aspects of the implementations are not essential to any particular embodiment of the nested database technology. In view of the foregoing, and without limitation, the following definitions will allow persons of ordinary skill in the art to better appreciate the exemplary embodiments described herein.

A database defines a logical set of objects that can only be modified by transactions executing in that database. A transaction is always begun in the context of one database only. The transaction is said to visit that database. The transactions that execute in the context of a database are termed the visiting transactions of that database. Transactions can begin and commit or abort sub-databases.

A database may be assigned arbitrary lock mode parameters. Visiting transactions can also be assigned arbitrary lock mode parameters, irrespective of the lock mode parameters assigned to the database they visit.

Operations on databases and transactions enable the construction of a hierarchy of nested databases. Throughout this document, we will use the following terminology to describe the relation between databases. The database visited by a transaction that creates a sub-database D is called the parent of D. Inversely, D is called the child of the database its creator is visiting. The terms superiors and inferiors are used to denote the transitive closure of the parent and children relations. Similarly, the terms ancestors and descendants are used to denote the reflexive transitive closure of the parent and children relations. Accordingly, the following notations are used throughout this document to refer to the relationships between databases, and between databases and transactions.

| | |
|---|---|
| Creator(D) | transaction that begun the database D |
| visited(T) | database visited by transaction T |
| Superior(D) | set of superiors of a database D |
| Inferior(D) | set of inferiors of a database D |
| Ancestor(D) | = Superior(D) $\cup$ {D} |
| Descendant(D) | = Inferior(D) $\cup$ {D} |

A transaction can modify the objects of the database it visits only. However, it can read objects from any descendant databases of its database, subject to lock compatibility, i.e., when its read locks do not conflict with the write locks of the descendant databases or any of their visiting transactions. Note that, read locks, write locks or both may be parameterized. Further note that, in any case, a transaction is confined to the sub-hierarchy of databases rooted by the database the transaction is visiting. In order to distinguish transactions that visit a database D from transactions of superior databases that can read objects from D, we call the latter observers of D.

Nested databases form a hierarchy of disjoint logical sets of objects, in which objects can move downward the hierarchy upon explicit commands from transactions holding write locks on them, and upward upon a sub-database's commit or abort operation. More precisely, committing a database transfers the control of all the database's objects to the transaction that created that database. Aborting a database undoes all the updates performed by visiting transactions of the database and transfers control of the objects that were moved into the database back to the database's creator.

For a transaction to commit, all its sub-databases must be either committed or aborted. A sub-database can commit only if no transaction is visiting it. When committing a sub-database with visiting transactions, the sub-database creator can be given the choice of either waiting for the ongoing visiting transactions of that sub-database to commit, or immediately aborting them. The physical object repository where objects physically reside is represented by a transaction processing system database created by an hypothetical transaction. This database is the root of all databases. Unless explicitly specified, a new transaction visits the root database.

An object can belong to only one database at a time. Let the a transaction, D the database that T visits, and DT a sub-database begun by T There are only three ways for an object O to enter the database $D_T$:

1. O belongs to D, T visits D and holds a write lock on O, and T explicitly moves O into $D_T$. Note that moving O to $D_T$ removes it from D, and therefore prevents T from modifying O. T might however be able to continue reading O assuming it created $D_T$ with parameters compatible with the lock mode T uses to acquire read locks.
2. O is created by a visiting transaction of $D_T$.
3. O belongs to a sub-database of a transaction $T_x$ that visits $D_T$, and $T_x$ commits that sub-database. The conditions for committing a transaction's sub-database will be detailed later.

Nested Databases and Parameterized Lock Modes

Transactions may be assigned some lock mode parameters and must use them to acquire all their locks. Parameters may be specified separately for read and write lock modes. The following notation is used throughout this document to denote assignment of lock mode parameters to a transaction:

|  | Locking Modes Used by T | |
| --- | --- | --- |
| Specification | Read Access | Write Access |
| T uses a | R(a) | W(a) |
| T uses R(a) | R(a) | W |
| T uses W(a) | R | W(a) |
| T uses R(a)W(b) | R(a) | W(b) |

Parameterized lock modes are assigned upon transaction start and cannot be changed thereafter.

A transaction can create a sub-database and assign it a set of write parameters. In the realizations described herein, read parameters are not employed for sub-databases; therefore, for a given sub-database D, the notation D uses a is interchangeable with D uses W(a). When the transaction moves an object on which it holds a write lock into its sub-database, the write lock is changed for a write lock with the sub-database's parameters. When later the sub-database is committed, the write locks of its objects are converted back to the write mode originally used by the sub-database's creator.

There are several subtleties in this mechanism, related to the parameter chosen for a sub-database. Moving an object to a sub-database with write parameters different from the write parameters used by the sub-database's creator makes the lock of the object either more or less restrictive that the creator's lock. For instance, if the sub-database's creator uses for write parameters the set {a, b} while the sub-database uses {a}, then potentially more transactions can read the object. This may become a problem when the creator later tries to commit the sub-database and some observer transaction has acquired a read lock that is incompatible with the creator's lock, but which is compatible with the sub-database lock.

How to treat this case? A first possibility is to postpone the commitment of the sub-database until all the observer transactions that hold a read lock that conflicts with a write lock of the creator of the database have completed. This approach is analogous to having the creator queuing a request for a lock on the objects of the sub-database. This approach might be unacceptable because the blocking observer transaction can last very long. Another possibility is to allow the creator of the sub-database to abort inopportune observers of the sub-database upon its commit. There again, such an approach might be unacceptable if the observer is a long-running transaction. A third possibility is to convert the parameters used by the sub-database's creator to the less restrictive parameters of the committed sub-database.

Similarly, if the sub-database's creator uses for write parameters the set {a} while the sub-database uses {a, b}, then fewer transactions can read the object. The problem then is that an object cannot be moved to the sub-database until some observer transaction completes.

By contrast, transactions.are free to use lock mode parameters that differ from those assigned to the database they visit. For instance, consider a database D that is assigned a set of parameters {a, b}, a transaction T, visiting D and using a set {a}, and a transaction $T_o$ visiting a superior of D and using the set {a} to parameterize its read locks. Although this configuration allows $T_o$'s read lock to be compatible with $T_v$ write locks, D's write lock on every object of D would prevent $T_v$ from accessing any objects of D, including the one write locked by $T_o$.

To summarize, the following policy is assumed in this document. Transactions are allowed to create sub-databases with write parameters different from the one they use. Object can be moved to a sub-database only if no other reader transaction blocks that operation (i.e., if all the read locks on the object are compatible with a write lock parameterized with the sub-database's assigned parameters). To prevent blocking by long-lasting observer transactions that have read objects of a sub-database, the creator of the sub-database is given the right to abort any transaction that prevents it to commit its sub-databases. A transaction using some read parameters is aware that it risks being aborted if it is blocking the termination of another transaction's sub-database for an unreasonably long period of time. Transactions can use lock mode parameters different from their enclosing database.

FIG. 2 graphically illustrates the notion of nested databases with a simple example. Two transactions $T_1$ and $T_2$ that visit a root database 201 have each created a sub-database (sub-databases $D_1$ and $D_2$, respectively) with the write parameter {a}. A transaction $T_{1.1}$ that visits database $D_1$ has in turn created a sub-database $D_{1.1}$, but with no parameter. Lastly, a transaction $T_{1.1.1}$, which visits sub-database $D_{1.1}$, has created a sub-database $D_{1.1.1}$ with write parameter {a, b}.

Given the state illustrated in FIG. 2 and the foregoing definitions, the following properties can be shown:

- Transactions can only modify objects that pertain to the database they visit.
- Any transaction visiting the root database and using a superset of the set, {a}, for its read parameter can access objects of sub-databases $D_1$ and $D_2$ (i.e., can be an observer of sub-databases $D_1$ and $D_2$), provided that no visiting transaction of these databases holds a conflicting lock.
- Transactions visiting sub-database $D_1$ cannot read objects from sub-database $D_2$, irrespective of what parameter the visiting transaction uses, and vice-versa.
- No transactions other than the visiting transaction of sub-database $D_{1.1}$ can read objects of sub-database $D_{1.1}$.
- Any transactions visiting the root database or sub-databases of sub-database $D_1$ (including sub-database $D_1$) and using a superset of {a, b} can read objects from sub-database $D_{1.1.1}$. (Note, however, that the object graph is such that only transactions visiting sub-database $D_{1.1}$ can actually obtain a path to objects in sub-database $D_{1.1.1}$).

The description that follows demonstrates how the above-described model of nested databases can be implemented using flexible locking mechanisms.

Flexible Locking Mechanisms

The concurrency control of many transaction models tend to be characterized by:

1. the number of lock ownership required by each transactional entity to realize the isolation mechanism,
2. the conflict detection mechanism,
3. the conflict resolution mechanism, and
4. the use of atomic transfer of lock ownership between lock owners in transaction operations.

In general, transaction models differ by the number of lock ownerships each transactional entity uses to realize the transaction model's concurrency control. For example, the original ACID transaction model just required one lock ownership per transaction. In general, the concurrency control of a nested transaction model supporting intra-transaction parallelism requires two lock ownerships per transaction: one for the locks the transaction needs for executing its program and one for retaining the locks of its committed sub-transactions. Some implementation of the transaction model described herein may employ up to three lock ownerships for its sub-databases. In general, a flexible lock manager should manage lock ownerships rather than transactions, and leave the mapping of lock ownerships to transactional entities to the specific transaction model implementation.

A conflict can be determined by the compatibility of operations against an object. Advanced transaction models typically extend this basic conflict detection model with additional rules to determine when a transaction can ignore a given type of conflict with another transaction. Hence, the conflict detection mechanism of most transaction models can be expressed solely using "ignore-conflict" relationships between different lock owners. For example, the semantics of a nested transaction model can be obtained by defining ignore-all-conflict rules between a transaction and its ancestors in the hierarchy of nested transactions. In another example, as illustrated in the above-incorporated U.S. patent application Ser. No. 09/663,208, entitled "Implementation of Parameterized Locking Modes Using Ignore-Conflict Relationships," naming Laurent Daynès and Ole Jørgen Anfindsen as inventors, filed 15 Sep. 2000, the effect of parameterized lock modes can be achieved by setting read-write and write-read ignore-conflict relationships between transactions that use parameter sets related by suitable boolean relationships. Accordingly, we believe that the conflict detection mechanism of a large variety of advanced transaction models can be modeled using ignore-conflict relationships between lock ownerships.

Lastly, most advanced transaction models require support for atomic lock ownership transfers, also referred as lock delegation. Release of a lock can be treated as a special case of lock delegation, where all the locks are atomically transferred to a special transaction with which every transaction can ignore conflicts. Hence, one view of a transaction processing system is one where each resource is under the control of some transactional entity, and where the database is just a "passive" transaction (i.e., a transaction that does not execute any program).

Locking Capabilities

A locking capability is the principal abstraction of the exemplary flexible lock manager described herein. It defines lock ownership within the lock manager. The interface of the exemplary flexible lock manager includes functions for declaring ignore-conflict relationships between locking capabilities, for requesting locks for a locking capability, for delegating locks of one or more locking capabilities to one or more other locking capabilities and for releasing the lock(s) of a locking capability.

A locking capability can generally be categorized as either active or passive. An active locking capability can be used to request locks, whereas a passive locking capability cannot. The only way for a passive locking capability to obtain a lock is via delegation of that lock from another locking capability.

Conflict Detection with Ignore Conflict Relationships

The state of a lock conceptually includes one owner set per lock mode. We denote Owners(l,A) the owner set of a lock l that correspond to the lock mode M. When considering read and write lock modes only, a lock state include the pair <Owners(l,Read), Owners(l, Write)>.

A lock manager determines conflict between the current owners of a lock and a requester of the lock in a given mode using a compatibility function Compatible($m_1,m_2$) that states whether a lock mode m1 is compatible with a lock mode $m_2$. Compatibility of locking modes is defined by the commutativity of the corresponding operations. The function Compatible is usually represented as a matrix, such as the one described earlier in FIG. 1B. An incompatibility of modes is considered a conflict. When considering read and write locking modes only, three types of conflict can occur: read/write (r/w), write/read (w/r), and write/write (w/w). More generally, a conflict m/$m_2$ signifies that the requester of a lock l in mode $m_1$ conflicts with owner(s) of lock l in mode $m_2$.

The exemplary lock manager supports a flexible conflict detection mechanism that allows a lock request to specify, in addition to the locking mode requested, a set of ignore-conflict relationships with other locking capabilities. An ignore-conflict relationship is a way to specify that one lock request can ignore an incompatible owner of a lock when evaluating conflicts for that request. For instance, a lock request issued from a locking capability $C_1$ may specify an ignore-conflict relationship with $C_2$. When deciding whether the requested lock can be granted to $C_1$, the lock manager will ignore all conflicts (read-write, write-read, write-write) with $C_2$. Ignore-conflicts relationships can be further refined to specify which kind of conflicts can be ignored, e.g., r/w, w/r, w/w, or any combination thereof.

More specifically, an ignore-conflict relationship involves two locking capabilities, one of which must be an active locking capability. A passive locking capability cannot ignore conflicts with other locking capabilities since it cannot request a lock and generate a conflict. On the other hand, an active locking capability can ignore conflicts with either a passive or an active locking capability. We use $$C_i \xrightarrow{m_1/m_2} C_j$$

to denote an ignore-conflict relationship that allows an active locking capability $C_i$ to ignore a conflict of type $m_1/m_2$ with a locking capability $C_j$, where $m_1/m_2$ can be any pair of potentially incompatible lock modes (e.g., r/w, w/r, or w/w) or set thereof. In an exemplary realization, ignoring a w/w conflict is subsumed into the case of ignoring all types of conflict and can be noted as all instead. Persons of ordinary skill in the art will recognize that these definitions can be refined for any given implementation, should it be necessary to include a richer variety of lock modes.

The current framework only allows symmetric ignore-conflict relationships between two active locking capabilities. A symmetric ignore-conflict relationships is denoted as $$C_i \xleftrightarrow{m_1/m_2} C_j$$

and is equivalent to the pair of asymmetric ignore-conflict relationships $$C_i \xrightarrow{m_1/m_2} C_j \text{ and } C_j \xrightarrow{m_2/m_1} C_i.$$

Each locking capability is associated with one set of ignore-conflict relationships per type of conflict. For a given locking capability C and conflict type $m_1/m_2$, the set is denoted $ICW(C,m_1/m_2)$. For a locking capability C, we always have $C \in ICW(C,m_1/m_2)$ for all pairs $m_1/m_2$ of incompatible lock modes. The flexible lock manager diagnoses a conflict for a request for a lock l in mode m by a locking capability C if the following condition is false:

$\forall m_i,$ Compatible(m, $m_i$) $\vee$ ($\neg$Compatible(m,$m_i$)$\wedge$(Owners(l, $m_i$) $\subset$ ICW(C,m m/$m_i$)))

We note that this conflict detection mechanism does not prevent the use of more sophisticated lock modes than the basic read and write. However, it is sometimes the case that the semantics provided by such sophisticated lock modes can be implemented using just the read and write lock modes along with a particular set of ignore-conflict relationships between lock ownerships (however, the converse is false).

Delegation of Locks

A lock manager enables a locking capability to atomically delegate locks to another locking capability, that is, to atomically transfer the ownership of locks from one locking capability to another. In the case of delegation of $C_i$'s locks to $C_j$, $C_i$ is referred as the delegator and $C_j$ as the delegatee.

In general, a request for delegating the lock of one locking capability to another can be blocking if other owners of the lock conflict with the delegatee. For instance, let us assume three locking capabilities $C_1$, $C_2$, and $C_3$ such that $$C_1 \xrightarrow{r/w} C_2,$$

and a lock l such that Owners(l,r)={$C_1$}, Owners(l,w))={$C_2$}. The request for delegating $C_1$'s ownership of l to $C_3$ is blocking because a read lock of $C_3$ conflicts with a write lock of $C_2$.

In some implementations, blocking delegation requests may be appended to a special delegation queue. Pending requests from such a delegation queue are treated before standard pending lock requests. By default, the delegator of the lock is blocked until the conflict is resolved. A delegation operation between active locking capabilities can however specify that blocking performs lazily. In that case, the delegator is not blocked. Instead, a blocking request is still appended to the blocking delegation queue, and the delegatee is blocked only upon an attempt to either commit or access the object protected by the delegated lock before the conflict is resolved.

As with other lock management events, the lock manager may be configured to notify blocking lock delegations so that transactions can customize their reaction (e.g., by refusing the delegation, negotiating an extension of the delegatee's ignore-conflict relationships so that the delegated lock can be granted, etc.)

Lock delegation operations come in multiple flavors, listed below:

delegate (l, $C_i$, $C_j$) $C_i$ delegates lock l to $C_j$
delegate ($C_i$, $C_j$) $C_i$ delegates all its locks to $C_j$
delegate (l, $C_i$,{$C_j^1$, $C_j^2$, ... $C_j^n$}) $C_i$ delegates lock l to {$C_j^1$, $C_j^2$, ... $C_j^n$}
delegate ($C_i$, {$C_j^1$, $C_j^2$, ... $C_j^n$}) $C_i$ delegates all its locks to {$C_j^1$, $C_j^2$, ... $C_j^n$}

Delegations to multiple locking capabilities are allowed only if the multiple delegatees do not conflict with each other. Otherwise, a deadlock situation is created.

Nested Databases using Locking Capabilities

We now discuss how locking capabilities can be used to implement nested databases. We start with some simplifying restrictions, e.g., (i) that a sub-database can only be created without parameters, and (ii) that transactions cannot themselves create new objects. We will eliminate these restrictions progressively.

Basic Design

The simplest model can be achieved by associating each transaction with a single active locking capability that will be used to acquire the lock of the transaction, and associating each database to a single passive locking capability (since they never acquire locks directly).

We assume that a sub-database is always created empty, then filled with objects by the sub-database's creator using some command taking some enumeration of objects. For a transaction to move an object into a sub-database, two conditions must be met. First, the sub-database must have been created by the transaction, and second, the transaction must hold a write lock on the object it wants to move. Moving the object makes it unavailable to any transaction outside of the sub-database, including its creator. This goal can be accomplished using delegation since, in the absence of parameterized lock modes, no other transactions except the sub-database creator hold a lock on that object. The following scenario illustrates more precisely how delegation can be used.

A transaction $T_i$, associated with a locking capability $C_i$, moves an object O to a sub-database D associated with a locking capability $C_D$. Transaction $T_i$ holds a write lock without parameter on object O. Moving object O to sub-database D actually consists of delegating $C_i$'s lock on object O to locking capability $C_D$. The effect achieved is that no transaction outside of sub-database D, including transaction $T_i$, can either write or read object O. What about sub-database D's visiting transactions? Allowing them to access object O is achieved by making them ignoring all type of conflicts with locking capability $C_D$. In other words, let transaction TiD be a visiting transaction of sub-database D and let $C_i^D$ be the locking capability of transaction $T_i^D$. Then, $$C_i^D \overset{all}{\to} C_D.$$

However, this is not enough. What we forgot in this reasoning is that a transaction is always enclosed in a database, and the locking capability of a database always holds a write lock on every object of the database. This means that delegating the write lock of the sub-database's creator is not enough as demonstrated by the following example.

Let us assume a database D and an object O of that database. Let us also assume that no transaction holds a lock on object O. In this case, the lock of object O is held in write mode by $C_D$, the locking capability of database D. When a transaction $T_i$ visits database D, its locking capability, $C_i$, can ignore all conflicts with $C_D$. After transaction $T_i$ has acquired a write lock on object O, object O has two write lock owners: $C_i$ and $C_D$. If transaction $T_i$ now creates a sub-database $D_i$, and moves object O into it, then delegating $C_i$'s lock on object O to $C_D$, the locking capability of $D_i$, is not enough. This is because locking capability $C_D$ still owns a write lock on object O and sub-database $D_i$'s visiting transactions only ignore conflicts with locking capability $C_{D_i}$. To achieve the semantics of moving the object O from transaction $T_i$'s visiting database to transaction $T_i$'s sub-database $D_i$, both the lock of $T_i$ and of its database D must be delegated to the sub-database $D_i$. In other words, both $C_i$'s and $C_D$'s locks must be delegated to locking capability $C_{D_i}$.

Note that, by themselves, ignore conflict relationships do not provide the effect of nested databases. For instance, we cannot use ignore conflict relationships between the visiting transactions of a database and the parent database to achieve the logical movement of an object because the ignore conflict relationships would allow the visiting transactions to access the objects of the parent database as well.

With the design described so far, when a visiting transaction terminates (e.g., by commit or abort), it releases the locks acquired with its locking capability. Database termination is more complex. Consider a sub-database D of a transaction T. Transaction T can commit sub-database D only when no transaction visits sub-database D. Committing sub-database D results in moving its objects up to the database that transaction T is visiting and makes the moved objects accessible to transaction T only. In order to achieve this, the lock of every object of sub-database D is converted into two locks: a write lock of transaction T and a write lock of the database visited by transaction T This conversion makes sub-database D's objects appear as if they were modified and/or created by transaction T. Conversion of one lock into two can be achieved by delegating D's locks simultaneously to transaction T and the database that transaction Tvisits (i.e., by performing delegate ($C_D$, $\{C_T, C_{visited(T)}\}$).

Aborting a sub-database must also result in setting the locks on the sub-database's objects back to their previous state. This objective can be achieved using the same sequence of locking manipulation that is used for a sub-database commit operation, i.e., delegation of the locks of the sub-database back to both the sub-database's creator and parent database. Note that a sub-database abort provokes an immediate abort of its visiting transactions, and proceeds only once all the sub-database's visiting transactions (and consequently, their sub-databases) are aborted.

Figure 3:
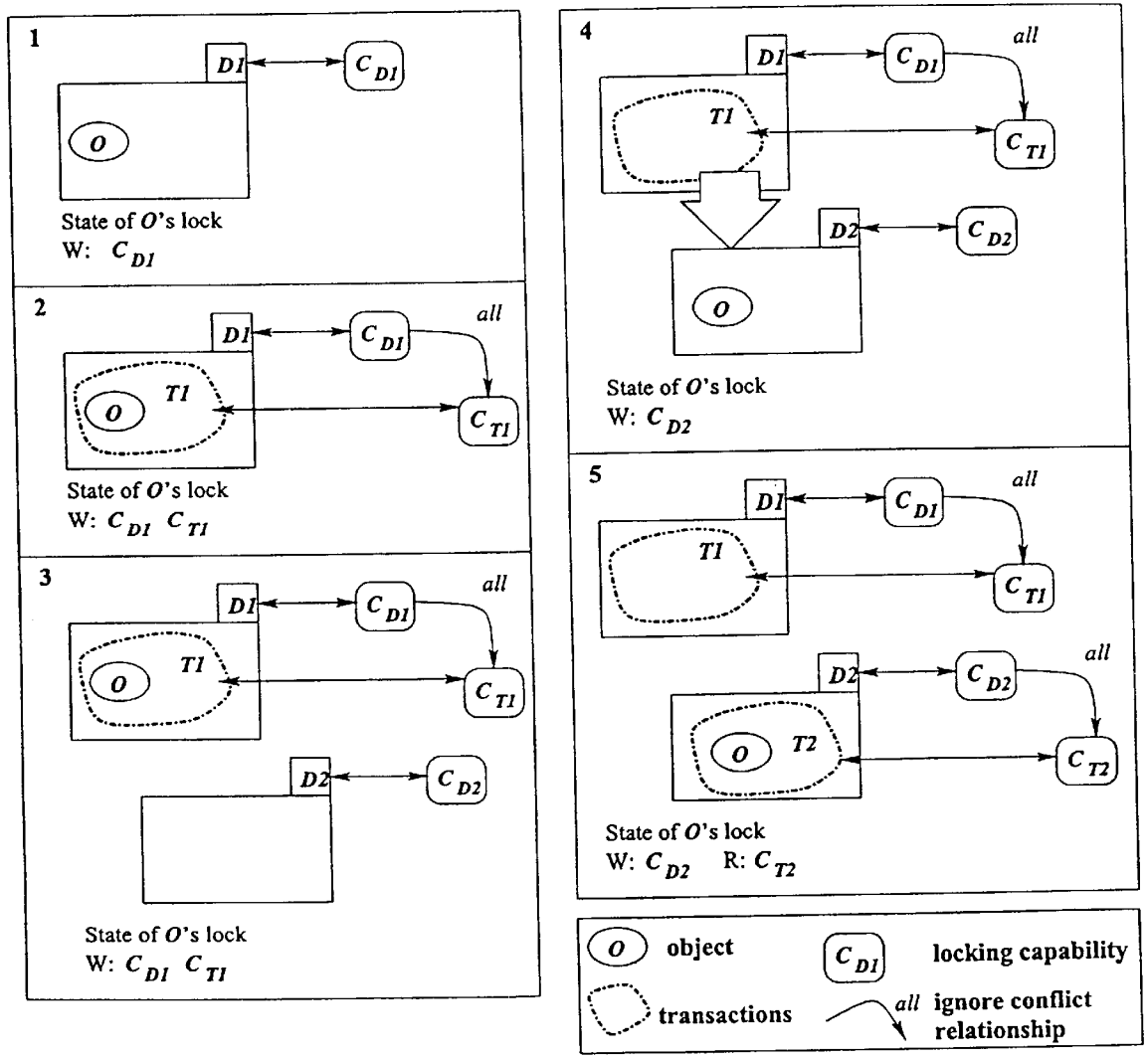
FIG. 3 illustrates use of locking capabilities to implement nested databases in accordance with an exemplary embodiment of the present invention.

FIG. 3 illustrates operation of a transaction processing system implementing the techniques described above. In particular, FIG. 3 illustrates how the state of an object's lock evolves as it is moved in a hierarchy of nested databases and further illustrates use of locking capabilities in a transaction processing system in accordance with an exemplary embodiment of the present invention.

FIG. 3 shows five successive states 1, 2, 3, 4 and 5. State 1 shows an initial database D1 with a single object O. The database D1 can be an arbitrary database in a nested database hierarchy. The lock of object O is held in write mode by the locking capability associated with the database D1, i.e., by locking capability $C_{D1}$.

State 2 illustrates the results of a visiting transaction T1 of database D1 that acquires a write lock on object O. First, the visiting transaction has an associated locking capability, $C_{T1}$, that can ignore all conflicts with locking capability $C_{D1}$ when acquiring locks. The lock of object O is now held by both locking capabilities $C_{D1}$, and $C_{T1}$.

State 3 illustrates the creation of a sub-database of T1. An empty database, D2, is associated with a new locking capability, $C_{D2}$. The state of the lock of object O remains unchanged.

State 4, illustrates the results of movement, by transaction T1, of object O to transaction T1's sub-database D2. The state of object O's lock is changed as the result of delegation of both locking capability $C_{T1}$'s lock and locking capability $C_{D1}$'s lock on object O to locking capability $C_{D2}$.

Finally, state 5 illustrates what happens then when transaction T2 visits the sub-database D2 and requests a read lock on object O. The read lock is granted since T2 can ignore conflicts with sub-database D2. Later, when transaction T2 commits, it will release its locks, returning the database hierarchy to the state illustrated as state 4. Then, when sub-database D2 is committed by transaction T1, all of sub-database D2's locks are delegated to both transaction T1 and database D1, effectively returning the state of both the database hierarchy and O's lock to the state illustrated as state 2.

Using Parameterized Lock Mode with Nested Databases

Co-pending U.S. patent application Ser. No. 09/663,208, entitled "Implementation of Parameterized Locking Modes Using Ignore-Conflict Relationships," naming Laurent Daynès and Ole Jørgen Anfindsen as inventors, filed 15 Sep. 2000, and which is incorporated herein by reference, showed how the effect of parameterized lock modes can be achieved using symmetric ignore-conflict relationships for non-nested databases.

For example, the effect of using a parameter S for reads can be achieved by symmetrically ignoring read-write conflicts with every transaction using a sub-set of S for writes. Inversely, the effect of using a parameter set S for writes can be achieved by symmetrically ignoring write-read conflicts with every transaction using a super-set of S for reads. These ignore-relationships are set upon assignment of parameter sets to a transaction. The set of transactions with which to ignore-conflict can be determined using a table that maps parameter sets to the transactions that use them. The table need only keep track of active parameter sets, that is, parameter sets used by running transactions.

In realizations that employ a particular boolean relation, assignment of a read (respectively, write) parameter set S to a transaction causes a search for sub-sets (respectively super-sets) of S. A symmetric ignore read-write (write-read) conflict relationship is established with every transaction using that sub-set (super-set), for parameterizing write (read) locks. Of course, as described in the above-incorporated patent application, other boolean relations may be employed with suitable modifications.

Such parameterized lock modes can be extended to support nested databases as follows. Let The a transaction and O an object that currently resides in a database visited by T (denoted herein as visited(T)). A transaction processing system in accordance with the present invention may then define the following locking rules for nested databases with parameterized lock modes:

1. T can be granted a write lock on object O if (i) object O belongs to visited(T), (ii) no other transaction holds a write lock on object O, and (iii) all read locks on object O are parameterized with a super-set of transaction T's write lock mode parameter set.
2. Transaction Tcan be granted a read lock on object O if (i) object O belongs to a descendant database of visited (T) and (ii) all the write locks on object O are parameterized with a sub-set of transaction Ts read lock mode parameter set.

More formally, such locking rules can be achieved by establishing the following ignore-conflict relationships (C denotes the locking capability associated with transaction or database X) under the following conditions:

$$\forall T, \forall T_w, \forall X, \forall Y, T \text{ uses } R(S)W(X) \wedge T_w \text{ uses } R(Y)W(S_w) \wedge S_w \subseteq \quad (1)$$
$$S \wedge visited(T_w) \in Descendant(visited(T)) \; C_T \stackrel{r/w}{\leftrightarrow} C_{T_w}$$

$$\forall T, \forall D, \forall X, T \text{ uses } R(S)W(X) \wedge D \text{ uses } S_w \wedge S_w \subseteq \quad (2)$$
$$S \wedge D \in Inferior(visited(T)) \; C_T \stackrel{r/w}{\leftrightarrow} C_D$$

$$\forall T, \forall T_r, \forall X, \forall Y, T \text{ uses } R(X)W(S) \wedge T_r \text{ uses } R(r)W(S_y) \wedge S_r \supseteq \quad (3)$$
$$S \wedge visited(T_r) \in Ancestor(visited(T)) \; C_T \stackrel{w/r}{\leftrightarrow} C_{T_r}$$

where the notation $f_1 f f_2 f \ldots f f_n$ indicates the conjunction of Boolean clauses $f_1, f_1, \ldots f_n$ and where the rules specifying ignore-conflict relationships include two parts: (i) a conjunction of Boolean clauses expressing a condition over two arbitrary transactions or over an arbitrary transaction and an arbitrary database, and (ii) an ignore-conflict relationship. The second part indicates the ignore-conflict relationship to be set in the event that the condition of the first part evaluates as true. In an exemplary implementation, these rules are re-evaluated each time a transaction is assigned a new set of parameters. Typically, parameter assignments are made at transaction initiation.

Supporting Object Creation

Some embodiments in accordance with the present invention are targeted toward cooperative applications, such as applications involving design activities (e.g., CAD, CASE, co-authoring tool). Therefore, it is desirable to allow transactions to create new objects and cooperate to refine the created objects. For example, certain cooperative applications may advantageously allow new objects to be observed by external transactions and/or allow new objects to be passed to sub-databases for refinement by transactions of other users.

The design presented in the previous sections is insufficient to deal with the case of objects created by visiting transactions. For instance, consider the scenario illustrated in FIG. 3, and assume that transaction $T_2$ creates an object $O_n$. Object creation is a form of update, so the created object is initially locked by transaction $T_2$ in exclusive mode. Note that database $D_2$, i.e., Visited($T_2$), does not hold a lock on object $O_n$. The previously described protocol specified that upon commit, a visiting transaction releases all its locks. However, doing so makes the objects created by transaction $T_2$ available for updates by any transaction, including transactions that do not visit the database. This is because objects created by committed transactions are not covered by a write lock of their database. This problem can be corrected by changing the commit operation so that a committing transaction delegates all its locks to its visiting database instead of releasing them. This solves the mentioned problem, but introduces a new one: if the database is requested to abort, how can it distinguish its new objects from the one that were moved into it? Without this distinction, a sub-database lock on a created object will be delegated to both its parent database and creator transaction. A similar problem occurs when a transaction moves an object that it has just created into a sub-database. According to the previously described protocol, the lock of the moved object is delegated to the sub-database. When the sub-database completes (either by abort or commit), its lock is delegated both to its parent database and the transaction that created the sub-database. This is problematic if the transaction aborts.

These examples indicate that supporting new objects requires changes to the original protocol, because new objects must be treated differently from other objects when a sub-database commits, aborts, or receives an object from the transaction that created the sub-database.

First Approach

One approach for properly handling object creation is to explicitly track objects moved into a sub-database. When an object is created, it is atomically associated with a write lock of its creator. Note that objects created by ongoing visiting transactions of a database differ from other objects of that database in that the database does not hold a lock on them. This does not violate the desired concurrency control because a write lock of a transaction is always stricter or equal than a lock of the database visited by that transaction. Hence, while the lock of the visited database is redundant with a write lock of a transaction visiting the database; it makes the locking protocol more regular and easier to implement and understand.

Since a transaction always holds a write lock on the objects it creates, it can always move them into one of its sub-databases. Whereas the lock of an object not created by a transaction is held by both the transaction and the database it visits, the lock of an object created by a transaction is locked by that transaction only. This difference is important when moving an object because the former state of that object's lock will have to be re-established once the sub-database terminates.

In order to handle this difference, each sub-database is extended with two tables of object references called, respectively, the pulled objects table (POT) and the pulled created objects table (POCT). The POT of a database records objects that were moved into the database and that pre-existed the transaction that moved them. The POCT records objects that were moved into the database and that were created by the transaction that moved them. Hence, the POT and POCT of a database are disjoint.

When a transaction T moves an object O to a sub-database D, it first tests whether object O is locked by the database it visits. If it is the case, it means that object O was not created by transaction T. Transaction T then adds object O to sub-database D's POT and delegates both its lock and its database's lock on object O to sub-database D. Otherwise, object O is added to sub-database D's POCT and transaction T delegates its lock to sub-database D.

A transaction commits by delegating all its locks to the database it visits, and aborts by releasing all its locks. As explained earlier, delegation upon transaction commit is necessary for the object created by the transaction to be protected by a lock of the database.

Let D be a database, and T its creator. Transactions visiting a database D can access objects moved into database D, including those that were created by transaction T. These transactions can also augment database D with objects they create. Hence, within database D, three sets of objects can be distinguished:

1. The objects moved into database D and that were not created by transaction T These objects are recorded in the POT.
2. The objects that were created by transaction T. These objects are recorded in the POCT.
3. The objects that were created by committed visiting transactions of database D. These objects are neither in the POT or the POCT.

When database D commits, all three type of objects are moved up to transaction T. The state of the locks protecting objects that were not created in database D must be re-established to the state they were before these objects moved into database D. That is, the write locks of objects that pre-existed transaction T should be held both by transaction T's database and transaction T. whereas the write locks on the objects created by transaction T must be held by transaction T only. Failing to achieve this will result in incorrect situation if transaction T later aborts. Lastly, objects that were created by committed visiting transactions of database D should look like they were created by transaction T From a locking perspective, this means that the locks of these objects must be held in write mode by transaction T only. The following sequence of locking operations achieves the desired effects of a database commit:

1. Delegate database D's locks on all objects of the POT to both transaction T and transaction T's database.
2. Delegate all remaining locks to transaction T only.

When database D aborts, the locks of all objects that pre-existed database D must recover their state as of before database D's creation. The difference, when compared with commit handling, is that the objects created in database D are recovered (and therefore become garbage), and their lock must be cleaned up (i.e., released). The following sequence of locking operations achieves this goal:

1. Delegate database D's locks on all objects of the POT to both transaction T and transaction T's database.
2. Delegate database D's locks on all objects of the POCT to transaction T only.
3. Release all remaining locks of database D.

Figure 4:
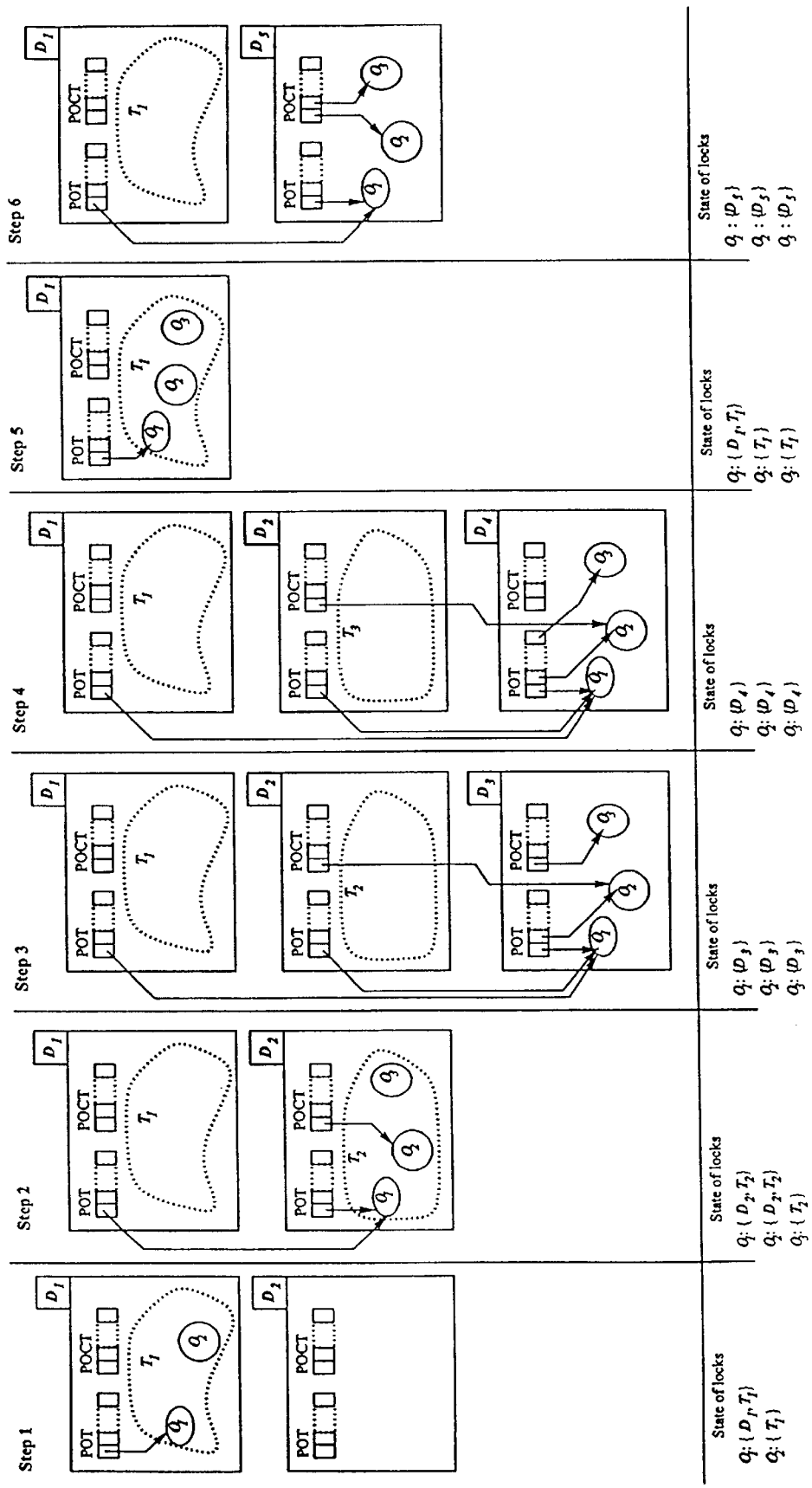
FIG. 4 illustrates a sequence of states for a pulled objects table (POT) and a pulled created objects table (POCT) in accordance with an exemplary embodiment of the present invention supporting nested database operations.

FIG. 4 provides a detailed example of how this approach works. The example shows multiple steps of a scenario employing nested databases. For simplicity, lock parameters are unused in the scenario. This means that a transaction cannot observe any objects out of its database. The bottom of FIG. 4 indicates the write lock holders of each object at each step (no object is read-locked in the entire scenario). The scenario starts (at Step 1) with a transaction $T_1$ that visits a database $D_1$. The database already holds an object $O_1$ from a parent database (not shown for simplicity). Transaction $T_1$ has acquired a write lock on object $O_1$, created a second object $O_2$, and started a sub-database $D_2$. Because object $O_1$ was moved into database $D_1$ by database $D_1$'s creator, its reference is stored in $D_1$'s POT.

Step 2 shows the state of each database's tables and each object's lock after transaction $T_1$ has moved all its objects (i.e., objects $O_1$ and $O_2$) to sub-database $D_2$, and a transaction $T_2$ that visits sub-database $D_2$ has acquired the write locks on both moved objects $O_1$ and $O_2$ and a third object $O_3$ created in subdatabase $D_2$. Note that object $O_1$ has been recorded in $D_2$'s POT, whereas object $O_2$ has been recorded to $D_2$'s POCT since it was created by transaction $T_1$.

Step 3 shows the state of the system after transaction $T_2$ has moved all its objects into a sub-database $D_3$ it has created. Since both objects $O_1$ and $O_2$ pre-existed transaction $T_2$, they are recorded in sub-database $D_3$'s POT. Object $O_3$ was created by transaction $T_2$ (i.e., sub-database $D_3$'s creator) and is therefore recorded in the POCT, according to the above-described rules for moving objects into a sub-database. When sub-database $D_3$ is committed, the locks on objects $O_1$, $O_2$ and $O_3$ will return to the state shown in Step 2. That is, sub-database $D_3$'s write locks on objects recorded in its POT (namely, objects $O_1$ and $O_2$) are delegated to both its creator (namely, transaction $T_2$) and its parent database (namely, sub-database $D_2$), whereas sub-database $D_3$'s write locks on objects recorded in its POCT (namely, object $O_3$) are delegated only to sub-database $D_3$'s creator (namely, transaction $T_2$).

Prior to Step 4, transaction $T_2$ has committed, resulting in the above described state (not specifically shown) equivalent to that illustrated in Step 2. Then, a second transaction, $T_3$, visits sub-database $D_2$. Transaction $T_3$ has acquired write locks on all three objects $O_1$, $O_2$, and $O_3$, and has moved them into the sub-database $D_4$ it has created. The resulting state is illustrated as Step 4. The main difference between this situation and the previous one is that all three objects are referenced from the POT, whereas, object $O_3$ was referenced from the POCT in Step 3. The difference results from the fact that object $O_3$ pre-existed transaction $T_3$ and was already locked by sub-database $D_2$. Accordingly, when transaction $T_3$ moves object $O_3$ into sub-database $D_3$, it has to delegate both its lock and that of sub-database $D_2$ to sub-database $D_3$. As a result, object $O_3$'s reference is stored to sub-database $D_3$'s POT, so that a later commit of sub-database $D_3$ will know that sub-database $D_3$'s lock must be delegated both to sub-database $D_2$ and transaction $T_3$.

Step 5 shows the system after all descendant databases of transaction $T_1$ have committed. All objects created by visiting transactions of a committed sub-database of transaction $T_1$ are treated as objects created by transaction $T_1$. This result is reflected in the state of the system illustrated in Step 5. The locking status of objects $O_2$ and $O_3$ is the same, i.e., they are locked only by transaction $T_1$ and not referenced from any table of database $D_1$. Accordingly, when objects $O_2$ and $O_3$ are moved into a new sub-database of transaction $T_1$, i.e., sub-database $D_5$ (illustrated at Step 6), they are both recorded in the POCT of sub-database $D_5$, as if they were both created by transaction $T_1$, although object $O_3$ was actually created by a committed transaction of an inferior database of transaction $T_1$.

Throughout the above-described scenario, it is notable that when a transaction moves an object to one of its sub-databases, it does not remove that object's reference from either the POT or the POCT table of the database it visits. For instance, when transaction $T_2$ moved object $O_2$ to sub-database $D_3$, it does not remove object $O_2$'s reference from sub-database $D_2$'s POCT. If that were the case, the commit operation for sub-database $D_3$ would be unable to identify the table of sub-database $D_2$ to which object $O_2$'s reference should be stored back.

Note that, while not specifically illustrated, the design presented above is suitable for enforcement of the locking rules of a nested database when used with parameterized lock modes. This is because these locking rules define relationships between transactions, and are orthogonal to the status of an object (e.g., whether or not the object was created by a transaction). For instance, reconsider the scenario of FIG. 4 with the following assignment of sets of lock mode parameters, where $S_2 \supset D\ S_1$:

$T_1$ uses $S_1$, $D_2$ uses $S_2$, and $T_2$ uses $S_2$

In this case, no ignore-conflict relationships will be set up between transaction $T_1$ and both sub-database $D_2$ and transaction $T_2$. That is, since $S_2$ is not a sub-set of $S_1$, transaction $T_1$ cannot ignore a read-write conflict with sub-database $D_2$ or transaction $T_2$). On the other hand, let us assume that a transaction T that visits database $D_1$ and uses a set S such that $S \supset D\ S_2$. Further assume that transaction T is begun at an execution state such as illustrated at Step 2 of FIG. 4. Then, transaction T will be able to read both objects $O_2$ and $O_3$, since an ignore read-write conflict relationship has been established between transaction T and both sub-database $D_2$ and transaction $T_2$.

Eliminating Tables

The design described above included the maintenance of two object tables per nested database. These tables might be space-consuming if an application moves large sets of objects across nested databases. In addition, the tables contributed to meta-data that must be considered upon rollback. Therefore, in some implementations it is desirable to eliminate the pulled objects table and pulled objects created tables. One alternative is to rely on the lock manager to achieve the effect of discriminating pulled objects from pulled created objects. This goal can be achieved by defining two additional passive locking capabilities per nested database. These locking capabilities have a role similar to the object tables.

More precisely, each nested database D is associated with three passive locking capabilities, namely $C_D$, $C_D^{po}$ and $C_D^{poc}$, such that:

Locking capability $C_D$ holds a lock on every object of database D, except those objects created by ongoing visiting transactions of database D. Such objects are locked only by the creating visiting transaction until completion thereof.

Locking capability $C_D^{po}$ holds a lock on every object moved into database D that pre-existed database D's creator.

Locking capability $C_D^{poc}$ holds a lock on every object that is moved into database D and was created by database D's creator.

In this way, the passive locking capabilities of a database encode the three sets of locked objects with the following relations:

$$(C_D^{po} \cap C_D^{poc}) = \emptyset$$

$$C_D^{po} \cap C_D$$

$$C_D^{poc} \cap C_D$$

where $C_D^{po}$ is the pulled objects (PO) capability of database D and $C_D^{poc}$ is the pulled objects created (POC) capability of database D. Each plays an analogous role to the tables (POT and POTC, respectively) of the previously described implementation. As before, each transaction T is also associated with an active locking capability denoted $C_T$. Given these new associations to locking capabilities, the concurrency control of an transaction processing system supporting nested databases with parameterized lock modes and object creation can be implemented with the rules and resulting ignore-conflict relationships listed in FIG. 5.

The first two rules of FIG. 5 define the isolation imposed by databases, whereas the last three rules define the effect of parameterized lock modes and how they selectively relax the isolation imposed by the first two rules. As in the previous design, a transaction T visiting a database D commits by delegating all its locks to locking capability $C_D$, and aborts by releasing all its locks. Using delegation for the commit operation allows objects created by the committed transaction to be isolated by the database. Illustrative implementations of move, commit and abort operations based on delegation and release of appropriate locking capabilities are illustrated in FIGS. 6A, 6B and 6C, respectively.

Focusing on the move operation of FIG. 6A, when a transaction T moves an object O to one of its sub-databases D, it first determines whether it has created object O. In the illustrated implementation, this determination is performed by testing whether transaction T's visiting database holds a write lock on object O. If not, object O was created by transaction T and transaction T's lock on object O is delegated to both the sub-database D and sub-database D's POC capability, $C_D^{poc}$. Otherwise, both transaction T's lock and visited(T)'s lock on object O are delegated to the sub-database D and sub-database D's PO capability, $C_D^{po}$. Locks held by the PO and POC locking capabilities of a database are not delegated to a sub-database during a move operation, for the same reason that object references were not cleared from either a POT or a POCT table in the previous design. Note that the ignore-conflict relationships defined by rule 2 of FIG. 5 guarantee that moved objects will not create unwanted conflicts.

Focusing on the operations of FIGS. 6B and 6C, when a sub-database either commits or aborts, the locks on objects that were moved to that database must return to their previous state. In case of a sub-database D commit, the objects created in the context of sub-database D should appear to have been created by sub-database D's creator. In case of a sub-database D abort, the new objects created within sub-database D will be "uncreated" as a result of roll-backing the sub-database D and their locks must be released. Depending on the implementation, such objects may be explicitly freed or garbage collected. As with the previous design, the effect of database completion is achieved using a sequence of lock delegation operations. However, instead of enumerating over each object that was moved into the committing database and performing a per-object lock delegation, global lock delegation operations are used.

For example, a commit operation on sub-database D delegates all locks held by sub-database D to sub-database D's creator and delegates all locks held by the PO capability of sub-database D, i.e., by locking capability $C_D^{po}$, to the database visited by sub-database D's creator (i.e., to the locking capability $C_{visited(Creator(D))}$). An abort operation on sub-database D delegates all locks held by the PO capability of sub-database D, i.e., by locking capability $C_D^{po}$, to both sub-database D's creator and the database it visits. In addition, the abort operation delegates all locks held by the POC capability of sub-database D, i.e., by locking capability $C_D^{poc}$, to sub-database D's creator.

Since the set of locks owned by $C_D$, $C_D^{po}$ and $C_D^{poc}$ overlap, a variety of sequences can be employed to achieve the same result. Choosing between approaches is somewhat arbitrary, although the sequence illustrated in FIG. 6B is attractive (when compared with alternatives) because redundant delegations are avoided and release of locks is likely to be handled efficiently by a lock manager implementation.

Note that the root database only requires a single locking capability, i.e., no passive locking capabilities to track pulled objects and pulled created objects, since it has no parent database from which to receive objects. When the number of objects transferred between databases is large, implementations that employ locking capabilities rather than tables can perform better in lock manager implementations that optimize bulk lock operations, such as release or delegation of all the locks of a transaction at once. Such implementations are likely to perform better because the cost of bulk lock operations can be small and independent of the number of delegated locks.

Exemplary Implementations

Prototypes of the above-described concurrency control mechanisms can be implemented using a flexible lock manager offering locking capabilities. For example, one prototype implementation has been developed in the JAVA programming language. JAVA and all Java-based marks and logos are trademarks or registered trademarks of Sun Microsystems, Inc. in the United States and other countries.

Figure 7:
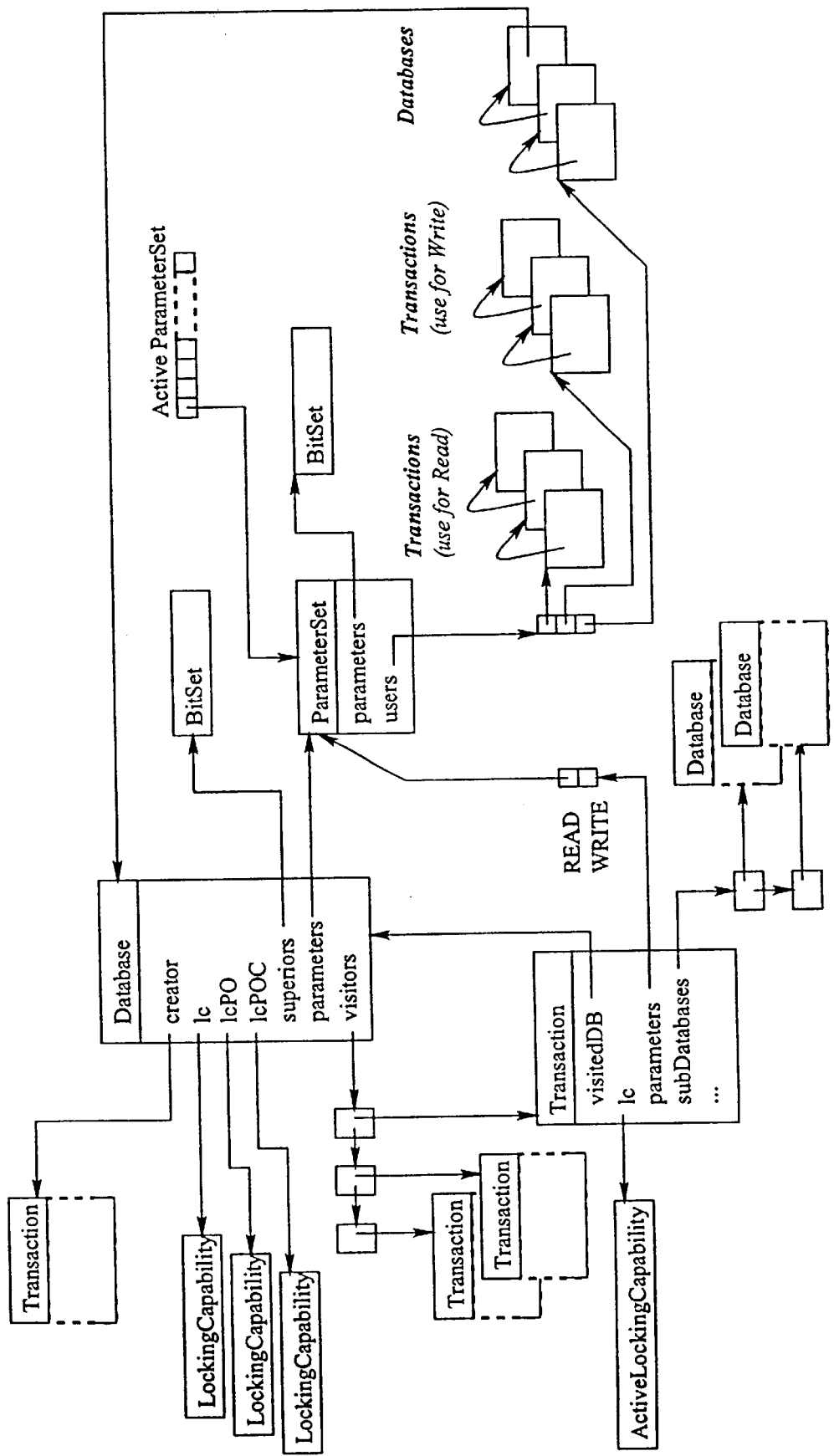
FIG. 7 illustrates major data structures employed in one implementation of an application oriented transaction processing system that allows specification of parameterized lock modes and in which a nested database facility is provided in accordance with some embodiments of the present invention.

FIG. 7 illustrates the main classes of an implementation of the desired concurrency controls. These include the Transaction, Database, and ParameterSet classes. Each instance of a Transaction class has references to the active locking capability and read and write parameters assigned to that transaction, to the database visited by that transaction, and to a list of sub-databases created by that transaction. Each instance of the Database has references to three passive locking capability objects, to its creator (an instance of Transaction), to a linked list of visiting transactions, and to the parameter set that was assigned to the database. A bit-set records all the superiors of the database to enable fast testing of whether a transaction visits a superior of that database.

Sets of parameters are represented as instances of the class ParameterSet. Each instance of that class includes a bit-set and three lists of users, i.e., one list of database using the set to parameterize their write locks and two lists of transactions, one for transactions using the set to parameterize read lock requests, and one for transactions using the set to parameterize w rite lock requests.

Parameter values may be associated with a unique identifier each so they can be organized into bit-sets for fast set-inclusion tests between sets of parameters. A parameter value can be an arbitrary object, as long as it is mapped to a unique parameter identifier.

The implementation of database and transaction operations is faithful to the design described in the previous sections. The only aspect that requires additional details is the maintenance of the ignore-conflict relationships upon the creation of either a new transaction or a new database. Each case is reviewed below.

To start a new transaction, an application first constructs a new instance of the class Transaction, calls its begin method, and, before executing any code on behalf of that transaction, assigns it the parameters it must use to parameterize its read and write lock requests, if any, by calling its use method. Constructing a new transaction object associates it an active locking capability from the lock manager object, sets its visitedDB field to the database specified to the constructor, and updates that database's list of visiting transactions to include the new transaction. The begin method of a transaction can initialize the ignore-conflict relationships between the transaction's active locking capability and the locking capabilities of the database it visits. In particular, the begin method may define ignore-conflicts relationships in accordance with rule 1 of FIG. 5.

Note that while a transaction that does not use parameterized lock modes does not gain access to objects of inferior databases of its database, use of parameterized lock modes is not essential. Rule 2 of FIG. 5 is unnecessary in that case. Accordingly, in some implementations, application of rule 2 is postponed until the parameters assigned to the transaction (if any) are known.

If the transaction isn't assigned any parameters, no additional ignore-conflict relationships need to be set up, and the transaction can start executing and requesting locks. Otherwise, several additional ignore-conflict relationships might need to be set up, according to rules 2 through 5 of FIG. 5. Note that these rules concern transactions and databases that appear in the same branch of a nested database hierarchy, i.e., the branch of the database visited by the new transaction. In one implementation, these ignore-conflict relationships are established in a single pass over the table of active ParameterSet.

Starting a new sub-database is very similar to starting a new transaction, i.e., the application first constructs a new instance of the Database class, calls its begin method, and, before performing any other database operations, or starting any visiting transactions, assigns the database with the parameter sets it must use for its write locks by calling its use method. Constructing an instance of Database initializes its parent and creator links as well as a bit-set of superiors. Beginning the sub-database registers the sub-database to its creator and associates three passive locking capabilities allocated by the lock manager. No ignore-conflict relationships need to be set up until some parameters are assigned to the database or some transactions visit it. The use method of a Database object traverses the hierarchy upward from the parent of the database up to the root database to find all transactions that use a super-set of the set of parameters assigned to the database to parameterize their read locks. An ignore read-write conflict relationship is set between each such transaction and the three locking capabilities of the new database, according to rule 3 of FIG. 5. All other rules concern transaction begin.

Illustrative Variations

While the invention has been described with reference to various embodiments, it will be understood that these embodiments are illustrative and that the scope of the invention is not limited to them. Many variations, modifications, additions, and improvements are possible. In addition, to those described above, two major sources of variation include (1) use of alternative relations between parameter sets to discriminate between compatible and incompatible modes and (2) differing and/or more complex sets of locking modes.

Generalizing Relations between Parameter Sets

In general, lock modes may be parameterized by association with a set of values from a parameter value domain and the particular parameterization by associated transactions affects the interpretation of compatibility between lock modes. In the illustrative context described above, a subset relation was used to affect the interpretation of compatibility between two lock modes based on contents of respective parameter sets. However more generally, the relation between parameter sets used to discriminate between compatible and incompatible modes of an associated lock may be any arbitrary boolean expression Φ over the parameter sets. Examples of suitable expressions include simple set relations such as ⊂, ⊃, ∩ etc., but more generally can extend to arbitrary expressions over the respective parameter sets.

While use of the subset relation was particularly intuitive, more generally, an application may assume any arbitrary expression in its assignment of parameterizations to achieve a desired concurrency control. Based on the particular relation selected, suitable modifications may be made to the corresponding relations employed in transforming parameterized uses to ignore-conflicts relations. In the context illustrated above, application or programming environments assumed the subset relation when using lock mode parameters to achieve desired concurrency controls.

Use of a Boolean expression Φ over the parameter sets affects the previously illustrated ignore-conflicts rules (recall FIG. 5) as illustrated in FIG. 8A. Note that the Boolean expression Φ takes a lock mode with read semantics as its first argument and a lock mode with write semantics as its second argument. Based on the description herein, persons of ordinary skill in the art will appreciate a wide variety of suitable relations.

Relevant Sets of Lock Modes

For purposes of illustration, the description herein has focused on a simple set of locking modes (i.e., R and W). However, persons of ordinary skill in the art will appreciate that other sets of lock modes may be employed. Accordingly he previously illustrated ignore-conflicts rules can be further generalized. We use a dense notation $$C_1 \xleftrightarrow{\{a_1,\ldots,a_n\}/\{b_1,\ldots,b_m\}} C_2$$

to denote a set of ignore-conflict relationships:

$$\left\{ \forall a_i \in \{a_1, \ldots, a_n\}, \forall b_k \in \{b_1, \ldots, b_m\} \,\middle|\, C_1 \xleftrightarrow{a_i/b_k} C_2 \right\}.$$

As described above, each lock mode can be classified either a lock mode for operations with read semantics or a lock mode for operations with write semantics. The difference between the two classifications is that the latter requires some recovery actions on user-visible data on rollback, whereas the former does not. Irrespective of the number of distinct lock modes employed in a given implementation, a transaction need specify at most two lock mode parameters, one that is associated with lock modes with read semantics and one that is associated with lock modes with write semantics.

Accordingly, ignore-conflicts relationships that establish the previously described nested database semantics can be extended as illustrated in FIG. 8B where $M_r$ denotes a set of lock modes with read semantics (e.g., {R,IR}), where $M_w$ denotes a set of lock modes with read semantics (e.g., {W,U,IW}), and where $S_r$ and $S_w$ respectively denote lock mode parameters associated with the locks modes having read and write semantics.

For simplicity of illustration, the assignment of lock mode parameters is assumed to be on a per lock mode semantics basis, i.e., for a given parameter S, uses R(S) specifies that lock modes with read semantics are assigned a parameter S and uses W(S) specifies that lock modes with write semantics are assigned the parameter S. However, persons of ordinary skill in the art will recognize that ignore-conflicts relationships suitable for establishing nested database semantics (e.g., as illustrated in FIG. 8B) can easily be altered to allow specification of parameters on a per lock mode basis (i.e., such that each individual lock mode is assigned different lock mode parameters):

One alternative set of access modes includes browse (B), read (R), intention to read (IR), upgrade (U), write (W), intention to write (IW) and read with intention to write (RIW). Of these, R, B and IR can be classified as access modes having read semantics (Mr) and W, U, IW, and RIW can be classified as access modes having write semantics. Although a variety of conditional compatibility configurations are possible, in one exemplary configuration, the following modes may be considered conditionally compatible:

| $M_r$ | $M_w$ |
|---|---|
| R | W |
| R | U |
| R | IW |
| R | RIW |
| IR | U |
| IR | W |

Other commonly employed lock modes include intention none (IN), share or shared (S), intent share (IS), update (U), exclusive (X), intent exclusive (IX) and share with intent exclusive (SIX), which generally correspond to the previously introduced browse, read, intention to read, upgrade, write, intention to write and read with intention to write lock modes. In general, the set of lock modes employed is implementation dependent and any suitable set may be employed.

More generally, realizations in accordance with the present invention have been described in the context of particular embodiments. These embodiments are meant to be illustrative and not limiting. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the exemplary configurations may be implemented as a combined structure or component. These and other variations, modifications, additions, and improvements may fall within the scope of the invention as defined in the claims that follow.

What is claimed is:

1. A method of providing concurrency control in a nested set of databases, the method comprising:

associating respective locking capabilities with transactions and databases;

if one of the transactions, $T_1$, associated with one of the locking capabilities $C_1$, moves an object O from a database, $D_1$, that it visits to a sub-database, $D_2$, associated with one of the locking capabilities, $C_{D_1}$, then delegating a lock held by the transaction $T_1$ on the object O from the locking capability $C_1$ to the locking capability $C_{D_2}$; and for a transaction, $T_2$, that visits the sub-database $D_2$ and has an associated one of the locking capabilities, $C_2$, ignoring conflicts with the locking capability $C_{D_2}$.

2. The method of claim 1,
wherein the delegating is by atomic transfer of lock ownership.

3. The method of claim 1,
wherein the transaction $T_1$ must hold a write lock on object O to perform the move.

4. The method of claim 1,
wherein the transaction $T_2$ is confined to objects that belong to either the sub-database $D_2$ or any descendant databases of the transaction $T_2$ in accordance with parameterized lock modes, if any, associated with the transaction $T_2$ and the descendant databases thereof.

5. The method of claim 1,
wherein the ignoring of conflicts includes ignoring read-write, write-read and write-write conflicts.

6. The method of claim 1,
wherein the ignoring of conflicts includes ignoring conflicts with descendant databases and visiting transactions thereof in accordance with parameterized lock modes.

7. The method of claim 1, wherein the ignoring of conflicts is in accordance with the following rules:

$$\forall T, \forall T_w, \forall X, \forall Y, T \text{ uses } R(S)W(X) \wedge T_w \text{ uses } R(Y)W(S_w) \wedge S_w \subseteq$$
$$S \wedge \text{visited}(T_w) \in \text{Descendant}(\text{visited}(T)) \; C_T \stackrel{r/w}{\leftrightarrow} C_{T_w}$$

$$\forall T, \forall D, \forall X, T \text{ uses } R(S)W(X) \wedge D \text{ uses } S_w \wedge S_w \subseteq$$
$$S \wedge D \in \text{Inferior}(\text{visited}(T)) \; C_T \stackrel{r/w}{\leftrightarrow} C_D$$

$$\forall T, \forall T_r, \forall X, \forall Y, T \text{ uses } R(X)W(S) \wedge T_r \text{ uses } R(S_r)W(Y) \wedge S_r \supseteq$$
$$S \wedge \text{visited}(T_r) \in \text{Ancestor}(\text{visited}(T)) \; C_T \stackrel{w/r}{\leftrightarrow} C_{T_r}.$$

8. The method of claim 1, wherein the ignoring of conflicts is in accordance with the following rules:

$$\forall T, \forall D, D = \text{visited}(T), \; C_T \stackrel{all}{\rightarrow} \{C_D, C_D^{po}, C_D^{poc}\}$$

$$\forall T, \forall D, \text{visited}(T) \in \text{Inferior}(D), \; C_T \stackrel{all}{\rightarrow} \{C_D^{po}, C_D^{poc}\}$$

$$\forall T, \forall D, \forall X, T \text{ uses } R(S)W(X) \wedge D \text{ uses } S_w \wedge S_w \subseteq$$
$$S \wedge D \in \text{Inferior}(\text{visited}(T)), \; C_T \stackrel{r/w}{\leftrightarrow} \{C_D, C_D^{po}, C_D^{poc}\}$$

$$\forall T, \forall T_w, \forall X, \forall Y, T \text{ uses } R(S)W(X) \wedge T_w \text{ uses } R(Y)W(S_w) \wedge S_w \subseteq$$
$$S \wedge \text{visited}(T_w) \in \text{Descendant}(\text{visited}(T)), \; C_T \stackrel{r/w}{\leftrightarrow} C_{T_w}$$

$$\forall T, \forall T_r, \forall X, \forall Y, T \text{ uses } R(X)W(S) \wedge T_r \text{ uses } R(S_r)W(Y) \wedge S_r \supseteq$$
$$S \wedge \text{visited}(T_r) \in \text{Ancestor}(\text{visited}(T)), \; C_T \stackrel{w/r}{\leftrightarrow} C_{T_r}$$

9. The method of claim 1, further comprising:
if the object O was not created by the transaction $T_1$, then further delegating a lock held by the database $D_1$ on the object O from an associated one of the locking capabilities, $C_{D_1}$, to the locking capability $C_{D_2}$.

10. The method of claim 1, further comprising:
distinguishing between first, second and third groups of zero or more objects of the sub-database $D_2$, wherein objects of the first group were moved by the transaction $T_1$ to the sub-database $D_2$ but not created by the transaction $T_1$, wherein objects of the second group were created by the transaction $T_1$, and wherein objects of the third group were created by committed visiting transactions of the sub-database $D_2$.

11. The method of claim 10, further comprising:
committing the sub-database $D_2$ by delegating its locks on objects of the first group to both $C_1$ and $C_{D_1}$ and delegating its locks on any remaining objects to $C_1$.

12. The method of claim 10, further comprising:
aborting the sub-database $D_2$ by delegating its locks on objects of the first group to both $C_1$ and $C_{D_1}$, delegating its locks on objects of the second group to $C_1$, and releasing its locks on any remaining objects to $C_1$.

13. The method of claim 10, further comprising:
committing any particular one of the databases by:
delegating its write locks on objects of the first group to both a particular one of the transactions that created the to-be-committed database and a particular one of the databases that the creating transaction visits; and
delegating its write locks on any remaining objects to the creating transaction.

14. The method of claim 10, further comprising:
aborting any particular one of the databases by:
delegating its write locks on objects of the first group to both a particular one of the transactions that created the to-be-committed database and a particular one of the databases that the creating transaction visits;
delegating its write locks on objects of the second group to the creating transaction; and
releasing its write locks on any remaining objects.

15. The method of claim 1, further comprising:
committing the transaction $T_2$ by delegating its locks to the sub-database $D_2$.

16. The method of claim 1, further comprising:
aborting the transaction $T_2$ by releasing its locks.

17. The method of claim 1, further comprising
committing any particular one of the transactions by delegating its locks to the respective one of the databases it visits.

18. The method of claim 1, further comprising:
aborting any particular one of the transactions by releasing its locks.

19. The method of claim 10,
wherein the distinguishing employs a pulled objects table and a pulled created objects table each associated with the sub-database $D_2$.

20. The method of claim 10,
wherein objects of the first group are recorded in the pulled objects table,
wherein objects of the second group are recorded in the pulled created objects table, and
wherein objects of the third group are not recorded in either the pulled objects table or the pulled created objects table.

21. The method of claim 10,
wherein objects of the first, second and third groups are encoded using passive locking capabilities associated with the sub-database $D_2$.

22. The method of claim 10,
wherein the distinguishing employs two additional locking capabilities, $C_{D_2}^{PO}$ and $C_{D_2}^{POC}$, each associated with the sub-database $D_2$.

23. The method of claim 22,
wherein locks for objects of the first group are further delegated to the locking capability $C_{D_2}^{PO}$, and
wherein locks for objects of the second group are further delegated to the locking capability $C_{D_2}^{POC}$.

24. The method of claim 10,
wherein, for a particular object, the distinguishing between the first and second groups is based on ownership by $D_1$ of a write lock on the particular object.

25. The method of claim 1,
wherein the lock delegation is coincident with object movement.

26. A concurrency control method comprising:
delegating one or more locks on an object moved from a first database visited by a first transaction to a subdatabase thereof, the delegated one or more locks including at least one lock associated with the first transaction; and
for a second transaction that visits the subdatabase, ignoring conflicts with locks associated with the subdatabase, including the delegated one or more locks.

27. The concurrency control method of claim 26, further comprising:
distinguishing between objects created by a particular transaction and those not created by the particular transaction,
wherein, if the moved object was not created by the first transaction, then the delegated locks further include a lock associated with the first database.

28. A transaction processing system that supports nested first and second databases, the transaction processing system comprising:
a lock manager that associates locking capabilities with transactions and databases, that allows specification of certain conflicts between locking capabilities to be ignored, and that supports delegation of locks from one of the locking capabilities to another;
at least one initialization sequence that, for a first one of the locking capabilities associated with a first transaction, specifies ignore conflicts relationships with other ones of the locking capabilities respectively associated with the first and second databases, wherein the first database is visited by the first transaction and the second database is a sub-database thereof; and
a move object sequence that delegates one or more locks on an object moved by the first transaction from the first database to the second database.

29. The transaction processing system of claim 28, wherein the at least one initialization sequence includes:
a first sequence executable coincident with start of the first transaction; and
a second sequence executable coincident with start of the second database.

30. The transaction processing system of claim 29, wherein the least one initialization sequence further includes:
a third sequence executable coincident with definition of concurrency controls corresponding for the first transaction.

31. The transaction processing system of claim 28,
wherein the desired concurrency controls are specified in terms of uses of parameterized lock modes; and
wherein the specifying of ignore conflicts relationships is in accordance with the following relations:

$\forall T, \forall D, D = \text{visited}(T), \quad C_T \overset{all}{\rightarrow} \{C_D, C_D^{po}, C_D^{poc}\}$ $\forall T, \forall D, \text{visited}(T) \in \text{Inferior}(D), \quad C_T \overset{all}{\rightarrow} \{C_D^{po}, C_D^{poc}\}$ $\forall T, \forall D, \forall X,$ $T$ uses $R(S)W(X) \wedge D$ uses $S_w \wedge \Phi(S, S_w) \wedge D \in \text{Inferior}(\text{visited}(T))$, $$C_T \overset{M_r/M_w}{\longleftrightarrow} \{C_D, C_D^{po}, C_D^{poc}\}$$

$\forall T, \forall T_w, \forall X, \forall Y,$ $T$ uses $R(S)W(X) \wedge T_w$ uses $R(Y)W(S_w) \wedge \Phi(S, S_w) \wedge \text{visited}(T_w) \in$ $\text{Descendant}(\text{visited}(T))$, $C_T \overset{M_r/M_w}{\longleftrightarrow} C_{T_w}$ $\forall T, \forall T_r, \forall X, \forall Y,$ $T$ uses $R(X)W(S) \wedge T_r$ uses $R(S_r)W(Y) \wedge \Phi(S_r, S) \wedge \text{visited}(T_r) \in$ $\text{Ancestor}(\text{visited}(T))$, $C_T \overset{M_w/M_r}{\longleftrightarrow} C_{T_r}$ 32. The transaction processing system of claim 28, further comprising:
a commit database sequence that,
for a first set of locks corresponding to one or more objects moved to the second database by the first transaction but not created thereby, delegates the locks of the first set to both the first transaction and the first database; and
delegates a second set of locks to the first transaction.

33. The transaction processing system of claim 32,
wherein the second set corresponds to objects of the second database other than those moved to the second database by the first transaction but not created thereby.

34. The transaction processing system of claim 32, wherein the second set corresponds to:
objects of the second database created by the first transaction; and
objects created by committed visiting transactions of the second database.

35. The transaction processing system of claim 28, further comprising:
an abort database sequence that,
for a first set of locks corresponding to one or more objects moved to the second database by the first transaction but not created thereby, delegates the locks of the first set to both the first transaction and the first database;
for a second set of locks corresponding to one or more objects of the second database created by the first transaction, delegates the locks of the second set to the first transaction; and
releases a third set of locks.

36. The transaction processing system of claim 35, wherein the third set corresponds to:
one or more objects of the second database created by committed visiting transactions thereof.

37. A computer program product encoded in one or more computer readable media and comprising:
first instructions executable by a computing machine as part of a transaction T that visits a database $D_1$ to move an object O to a sub-database $D_2$, the first instructions adding a reference to the object O to a pulled objects encoding and delegating locks of both the transaction T and the database $D_1$ thereon to the sub-database $D_2$ if the object O was created by the transaction T, and otherwise adding a reference to the object O to a pulled objects created encoding and delegating a lock of the transaction T thereon to the sub-database $D_2$; and second instructions executable in the computing machine to terminate the sub-database $D_2$.

38. The computer program product of claim 37, wherein the second instructions commit the sub-database $D_2$ by:

delegating locks on all objects referenced in the pulled objects encoding to both the transaction T and the database $D_1$; and delegating remaining locks of the subdatabase $D_2$ to the transaction T.

39. The computer program product of claim 37, wherein the second instructions abort the sub-database $D_2$ by:

delegating locks on all objects referenced in the pulled objects encoding to both the transaction T and the database $D_1$;

delegating locks on all objects referenced in the pulled objects created encoding to the transaction T; and releasing remaining locks of the subdatabase $D_2$.

40. The computer program product of claim 37, further comprising:

third instructions executable in the computing machine to maintain ignore-conflicts relationships between transactions and databases.

41. The computer program product of claim 37, wherein the one or more computer readable medium are selected from the set of a disk, tape or other magnetic, optical, or electronic storage medium and a network, wireline, wireless or other communications medium.

42. An apparatus comprising:

means for maintaining, consistent with a desired concurrency control, ignore conflicts relations between transactions and databases visited or created thereby; and means for delegating locks between respective of the transactions and databases in accordance with movement of objects from a first of the databases visited by a first of the transactions to a second of the databases, which is itself a subdatabase of the first transaction; and means for delegating locks between respective of the transactions and databases in accordance with termination of the second database.

* * * * *

UNITED STATES PATENT AND TRADEMARK OFFICE
CERTIFICATE OF CORRECTION

PATENT NO.    : 6,772,154 B1
DATED         : August 3, 2004
INVENTOR(S)   : Daynes et al.

It is certified that error appears in the above-identified patent and that said Letters Patent is hereby corrected as shown below:

Title page,
Item [*] Notice, delete the phrase "by 356 days" and insert -- by 414 days --

Signed and Sealed this

Third Day of May, 2005

JON W. DUDAS
*Director of the United States Patent and Trademark Office*